(12) United States Patent
Taylor, III et al.

(10) Patent No.: US 6,959,542 B2
(45) Date of Patent: Nov. 1, 2005

(54) APPARATUS AND METHOD FOR OPERATING A FUEL REFORMER TO REGENERATE A DPNR DEVICE

(75) Inventors: William Taylor, III, Columbus, IN (US); Samuel N. Crane, Jr., Columbus, IN (US); Yougen Kong, Columbus, IN (US)

(73) Assignee: Arvin Technologies, Inc., Troy, MI (US)

(*) Notice: Subject to any disclaimer, the term of this patent is extended or adjusted under 35 U.S.C. 154(b) by 75 days.

(21) Appl. No.: 10/628,591

(22) Filed: Jul. 28, 2003

(65) Prior Publication Data

US 2005/0072140 A1 Apr. 7, 2005

Related U.S. Application Data

(63) Continuation-in-part of application No. 10/246,118, filed on Sep. 18, 2002.
(60) Provisional application No. 60/351,580, filed on Jan. 25, 2002.

(51) Int. Cl.[7] .................................. F01N 3/00
(52) U.S. Cl. ........................ 60/295; 60/274; 60/275; 60/276; 60/285; 60/287; 60/324; 422/169; 422/177; 422/182; 423/213.7
(58) Field of Search ................ 423/213.7, 239.1; 60/324, 285, 274, 275, 276, 286, 287, 288, 295, 297, 303; 422/169, 170, 171, 177, 182, 183

(56) References Cited

U.S. PATENT DOCUMENTS

| | | |
|---|---|---|
| 2,787,730 A | 4/1957 | Berghaus et al. |
| 3,018,409 A | 1/1962 | Berghaus et al. |
| 3,035,205 A | 5/1962 | Berghaus et al. |
| 3,423,562 A | 1/1969 | Jones et al. |
| 3,594,609 A | 7/1971 | Vas |
| 3,622,493 A | 11/1971 | Crusco |
| 3,649,195 A | 3/1972 | Cook et al. |
| 3,755,131 A | 8/1973 | Shalit |
| 3,779,182 A | 12/1973 | Camacho |
| 3,841,239 A | 10/1974 | Nakamura et al. |
| 3,879,680 A | 4/1975 | Naismith et al. |
| 3,894,605 A | 7/1975 | Salvadorini |

(Continued)

FOREIGN PATENT DOCUMENTS

| | | |
|---|---|---|
| DE | 3048540 A1 | 7/1982 |
| DE | 3337903 A1 | 5/1985 |
| DE | 237120 A1 | 7/1986 |

(Continued)

OTHER PUBLICATIONS

Jahn, "Physics of Electric Propulsion", pp. 126–130 (1968).
Belogub et al., "Petrol–Hydrogen Truck With Load–Carrying Capacity 5 Tons", Int. J. Hydrogen Energy, vol. 16, No. 6, pp. 423–426 (1991).
Breshears et al., "Partial Hydrogen Injection Into Internal Combustion Engines", Proceedings of the EPA 1st Symposium on Low Pollution Power Systems and Development, pp. 268–277 (Oct. 1973).
Chuveliov et al., "Comparison of Alternative Energy Technologies Utilizing Fossil Fuels and Hydrogen Based on Their Damage to Population and Environment in the USSR and East Europe", pp. 269–300.

(Continued)

Primary Examiner—Tu M. Nguyen
(74) Attorney, Agent, or Firm—Barnes & Thornburg LLP

(57) ABSTRACT

An emission abatement assembly includes one or more DPNR devices for removing both $NO_X$ and particulate soot from the exhaust gas of an internal combustion engine. Reformate gas from a fuel reformer is used to selectively regenerate the DPNR device or devices. A method of operating an emission abatement assembly is also disclosed.

13 Claims, 15 Drawing Sheets

U.S. PATENT DOCUMENTS

| | | | |
|---|---|---|---|
| 3,982,962 A | 9/1976 | Bloomfield | |
| 3,992,277 A | 11/1976 | Trieschmann et al. | |
| 4,036,131 A | 7/1977 | Elmore | |
| 4,036,181 A | 7/1977 | Matovich | |
| 4,059,416 A | 11/1977 | Matovich | |
| 4,099,489 A | 7/1978 | Bradley | |
| 4,144,444 A | 3/1979 | Dementiev et al. | |
| 4,168,296 A | 9/1979 | Lundquist | |
| 4,303,552 A | 12/1981 | Ernest et al. | |
| 4,339,564 A | 7/1982 | Okamura | |
| 4,359,862 A | 11/1982 | Virk et al. | |
| 4,372,111 A | 2/1983 | Virk et al. | |
| 4,436,793 A | 3/1984 | Adlhart | |
| 4,451,441 A | 5/1984 | Ernest et al. | |
| 4,458,634 A | 7/1984 | Carr et al. | |
| 4,469,932 A | 9/1984 | Spiegelberg et al. | |
| 4,473,622 A | 9/1984 | Chludzinski et al. | |
| 4,477,417 A | 10/1984 | Domesle et al. | |
| 4,485,621 A | 12/1984 | Wong et al. | |
| 4,515,758 A | 5/1985 | Domesle et al. | |
| 4,516,990 A | 5/1985 | Erdmannsdorfer et al. | |
| 4,522,894 A | 6/1985 | Hwang et al. | |
| 4,535,588 A | 8/1985 | Sato et al. | |
| 4,576,617 A | 3/1986 | Renevot | |
| 4,578,955 A | 4/1986 | Medina | |
| 4,625,511 A | 12/1986 | Scheitlin et al. | |
| 4,625,681 A | 12/1986 | Sutekiyo | |
| 4,645,521 A | 2/1987 | Freesh | |
| 4,651,524 A | 3/1987 | Brighton | |
| 4,657,829 A | 4/1987 | McElroy et al. | |
| 4,670,233 A | 6/1987 | Erdmannsdoerfer et al. | |
| 4,720,376 A | 1/1988 | Laue et al. | |
| 4,720,972 A | 1/1988 | Rao et al. | |
| 4,759,918 A | 7/1988 | Homeier et al. | |
| 4,828,807 A | 5/1989 | Domesle et al. | |
| 4,830,492 A | 5/1989 | Ko | |
| 4,841,925 A | 6/1989 | Ward | |
| 4,849,274 A | 7/1989 | Cornelison | |
| 4,902,487 A | 2/1990 | Cooper et al. | |
| 4,928,227 A | 5/1990 | Burba et al. | |
| 4,963,792 A | 10/1990 | Parker | |
| 4,967,118 A | 10/1990 | Urataki et al. | |
| 5,095,247 A | 3/1992 | Hanamura | |
| 5,138,959 A | 8/1992 | Kulkarni | |
| 5,143,025 A | 9/1992 | Munday | |
| 5,159,900 A | 11/1992 | Damman | |
| 5,205,912 A | 4/1993 | Murphy | |
| 5,207,185 A | 5/1993 | Greiner et al. | |
| 5,212,431 A | 5/1993 | Origuchi et al. | |
| 5,228,529 A | 7/1993 | Rosner | |
| 5,272,871 A | 12/1993 | Oshima et al. | |
| 5,284,503 A | 2/1994 | Bitler et al. | |
| 5,293,743 A | 3/1994 | Usleman et al. | |
| 5,317,996 A | 6/1994 | Lansing | |
| 5,362,939 A | 11/1994 | Hanus et al. | |
| 5,409,784 A | 4/1995 | Bromberg et al. | |
| 5,409,785 A | 4/1995 | Nakano et al. | |
| 5,412,946 A | 5/1995 | Oshima et al. | |
| 5,425,332 A | 6/1995 | Rabinovich et al. | |
| 5,437,250 A | 8/1995 | Rabinovich et al. | |
| 5,441,401 A | 8/1995 | Yamaguro et al. | |
| 5,445,841 A | 8/1995 | Arendt et al. | |
| 5,451,740 A | 9/1995 | Hanus et al. | |
| 5,560,890 A | 10/1996 | Berman et al. | |
| 5,599,758 A | 2/1997 | Guth et al. | |
| 5,660,602 A | 8/1997 | Collier, Jr. et al. | |
| 5,666,923 A | 9/1997 | Collier, Jr. et al. | |
| 5,746,989 A * | 5/1998 | Murachi et al. | 423/213.7 |
| 5,787,864 A | 8/1998 | Collier, Jr. et al. | |
| 5,813,222 A | 9/1998 | Appleby | |
| 5,826,548 A | 10/1998 | Richardson, Jr. | |
| 5,845,485 A | 12/1998 | Murphy et al. | |
| 5,847,353 A | 12/1998 | Titus et al. | |
| 5,852,927 A | 12/1998 | Cohn et al. | |
| 5,863,413 A | 1/1999 | Caren et al. | |
| 5,887,554 A | 3/1999 | Cohn et al. | |
| 5,894,725 A | 4/1999 | Cullen et al. | |
| 5,910,097 A | 6/1999 | Boegner et al. | |
| 5,921,076 A | 7/1999 | Krutzsch et al. | |
| 5,974,791 A | 11/1999 | Hirota et al. | |
| 6,012,326 A | 1/2000 | Raybone et al. | |
| 6,014,593 A | 1/2000 | Grufman | |
| 6,038,853 A | 3/2000 | Penetrante et al. | |
| 6,038,854 A | 3/2000 | Penetrante et al. | |
| 6,047,543 A | 4/2000 | Caren et al. | |
| 6,048,500 A | 4/2000 | Caren et al. | |
| 6,082,102 A | 7/2000 | Wissler et al. | |
| 6,090,187 A * | 7/2000 | Kumagai | 95/278 |
| 6,122,909 A | 9/2000 | Murphy et al. | |
| 6,125,629 A | 10/2000 | Patchett | |
| 6,130,260 A | 10/2000 | Hall et al. | |
| 6,134,882 A | 10/2000 | Huynh et al. | |
| 6,134,883 A * | 10/2000 | Kato et al. | 60/274 |
| 6,152,118 A | 11/2000 | Sasaki et al. | |
| 6,153,162 A | 11/2000 | Fetzer et al. | |
| 6,170,259 B1 * | 1/2001 | Boegner et al. | 60/286 |
| 6,176,078 B1 | 1/2001 | Balko et al. | |
| 6,193,942 B1 | 2/2001 | Okuda et al. | |
| 6,235,254 B1 | 5/2001 | Murphy et al. | |
| 6,248,684 B1 | 6/2001 | Yavuz et al. | |
| 6,284,157 B1 | 9/2001 | Eliasson et al. | |
| 6,287,527 B1 | 9/2001 | Kawanami et al. | |
| 6,294,141 B1 | 9/2001 | Twigg et al. | |
| 6,311,232 B1 | 10/2001 | Cagle et al. | |
| 6,322,757 B1 | 11/2001 | Cohn et al. | |
| 6,560,958 B1 * | 5/2003 | Bromberg et al. | 60/275 |
| 6,679,051 B1 * | 1/2004 | Upadhyay et al. | 60/286 |
| 6,708,486 B2 * | 3/2004 | Hirota et al. | 60/297 |
| 6,742,328 B2 * | 6/2004 | Webb et al. | 60/285 |
| 6,745,560 B2 * | 6/2004 | Stroia et al. | 60/286 |
| 6,779,339 B1 * | 8/2004 | Laroo et al. | 60/297 |
| 6,832,473 B2 * | 12/2004 | Kupe et al. | 60/286 |
| 2002/0012618 A1 | 1/2002 | Bromberg et al. | |
| 2002/0056273 A1 | 5/2002 | Itoch et al. | |
| 2002/0165063 A1 | 11/2002 | Ito | |
| 2002/0194835 A1 | 12/2002 | Bromberg et al. | |
| 2003/0010022 A1 | 1/2003 | Suzuki | |

FOREIGN PATENT DOCUMENTS

| | | |
|---|---|---|
| DE | 19510804 A1 | 9/1996 |
| DE | 19644864 A1 | 5/1998 |
| DE | 19757936 A1 | 7/1999 |
| DE | 19927518 A1 | 1/2001 |
| EP | 0096538 B1 | 12/1983 |
| EP | 0153116 A2 | 8/1985 |
| EP | 0382434 A2 | 8/1990 |
| EP | 04859922 A1 | 5/1992 |
| EP | 1057998 A | 5/2000 |
| FR | 2593493 A1 | 7/1987 |
| FR | 2620436 A1 | 3/1989 |
| GB | 355210 | 2/1930 |
| GB | 1014498 | 12/1965 |
| GB | 1221317 | 2/1971 |
| GB | 2188559 A | 10/1987 |
| GB | 2241746 A | 9/1991 |
| JP | 54-74419 | 6/1979 |
| JP | 02121300 A2 | 5/1990 |
| JP | 3-195305 | 8/1991 |
| JP | 5127630 A2 | 5/1993 |
| JP | 05231242 A2 | 9/1993 |
| JP | 07292372 A2 | 11/1995 |

| | | |
|---|---|---|
| JP | 9079024 A2 | 3/1997 |
| SU | 1519762 A1 | 11/1989 |
| WO | WO 85/00159 A1 | 1/1985 |
| WO | WO 94/03263 A1 | 2/1994 |
| WO | WO 95/06194 A1 | 3/1995 |
| WO | WO 96/24441 A2 | 8/1996 |
| WO | WO 96/27078 A1 | 9/1996 |
| WO | WO 98/45582 A1 | 10/1998 |
| WO | WO 00/26518 A1 | 5/2000 |
| WO | WO 01/14698 A1 | 3/2001 |
| WO | WO 01/14702 A1 | 3/2001 |
| WO | WO 01/33056 A1 | 5/2001 |

OTHER PUBLICATIONS

Correa, "Lean Premixed Combustion for Gas–Turbines: Review and Required Research", PD–vol. 33, Fossil Fuel Combustion, ASME, pp. 1–9 (1991).

Czernichowski et al., "Multi–Electrodes High Pressure Gliding Discharge Reactor and its Application for Some Waste Gas and Vapor Incineration", pp. 1–13 (1990).

Das, "Exhaust Emission Characterization of Hydrogen–Operated Engine System: Nature of Pollutants and their Control Techniques", Int. J. Hydrogen Energy, vol. 16, No. 11, pp. 765–775 (1991).

Das, "Hydrogen Engines: A View of the Past and a Look into the Future", Int. J. of Hydrogen Energy, vol. 15, No. 6, pp. 425–443 (1990).

Das, "Fuel Induction Techniques for a Hydrogen Operated Engine", Int. J. of Hydrogen Energy, vol. 15, No. 11, pp. 833–842 (1990).

DeLuchi, "Hydrogen Vehicles: An Evaluation of Fuel Storage, Performance, Safety, Environmental Implants and Cost", Int. J. Hydrogen Energy, vol. 14, No. 2, pp. 81–130 (1989).

Duclos et al., "Diagnostic Studies of a Pinch Plasma Accelerator", AIAA Journal, vol. 1, No. 11, pp. 2505–2513 (Nov. 1963).

Feucht et al., "Hydrogen Drive for Road Vehicles—Results from the Fleet Test Run in Berlin", Int. J. Hydrogen Energy, vol. 13, No. 4, pp. 243–250 (1988).

Finegold et al., "Dissociated Methanol as a Consumable Hydride for Automobiles and Gas Turbines", Proceedings of the $4^{th}$ World Hydrogen Energy Conference, vol. 3, pp. 1359–1369 (Jun. 13–17, 1982).

Hall et al., "Initial Studies of a New Type of Ignitor: The Railplug"—Paper 912319, pp. 1730–1746 (1991).

Houseman et al., "Hydrogen Engines Based On Liquid Fuels, A Review", G.E., Proc., $3^{rd}$ World Hydrogen Energy Conf., pp. 949–968 (1980).

Houseman, et al., "Two Stage Combustion for Low Emissions Without Catalytic Converters", Society of Automobile Engineering Meeting, SAE Paper 760759, pp. 1–9 (Oct. 18–22, 1976).

Jones, et al., "Exhaust–Gas Reforming of Hydrocarbon Fuels", Society of Automotive Engineers, Paper 931086, pp. 223–234 (1993).

Kaske et al., "Hydrogen Production by the Hülls Plasma–Reforming Process", Hydrogen Energy Progress VI, Proceedings of the 6th World Hydrogen Energy Conference, vol. 1, pp. 185–190 (Jul. 20–24, 1986).

MacDonald, "Evaluation of Hydrogen–Supplemented Fuel Concept with an Experimental Multi–Cylinder Engine", Society of Automotive Engineers, Paper 760101, pp. 1–16 (Feb. 23–27, 1976).

Mackay, "Development of a 24 kW Gas Turbine–Driven Generator Set for Hybrid Vehicles", Paper 940510, pp. 99–105, NoMac Energy Systems, Inc.

Mackay, "Hybrid Vehicle Gas Turbines", Paper 930044, NoMac Energy Systems, Inc., pp. 35–41.

Matthews et al., "Further Analysis of Railplugs as a New Type of Ignitor", Paper 922167, pp. 1851–1862 (1992).

Mishchenko et al., "Hydrogen as a Fuel for Road Vehicles", Proc. VII World Hydrogen Energy Conference, vol. 3, pp. 2037–2056 (1988).

Monroe et al., "Evaluation of a Cu/Zeolite Catalyst to Remove $NO_x$ from Lean Exhaust", Society of Automotive Engineers, Paper 930737, pp. 195–203 (1993).

Rabinovich et al., "On Board Plasmatron Generation of Hydrogen–Rich Gas for Engine Pollution Reduction", Proceedings of NIST Workshop on Advanced Components for Electric and Hybrid Electric Vehicles, pp. 83–88 (Oct. 1993) (not published).

Rabinovich et al., "Plasmatron Internal Combustion Engine System for Vehicle Pollution Reduction", Int. J. of Vehicle Design, vol. 15, Nos. 3/4/5, pp. 234–242 (1994).

Scott et al., "Hydrogen Fuel Breakthrough with On–Demand Gas Generator", 372 Automotive Engineering, vol. 93, No. 8, pp. 81–84 (Aug. 1985).

Shabalina et al., "Slag Cleaning by Use of Plasma Heating", pp. 1–7.

Handbook of Thermodynamic High Temperature Process Data, "Conversion of Hydrocarbons and Production of Reducing Gases in the C–H–O and C–H–O–N Systems", Chapter Nine, pp. 507–547.

Verde et al., "Reduction of Soot in Diesel Combustion with Hydrogen and Different H/C Gaseous Fuels", Hydrogen Energy Progress V, pp. 1631–1639.

Wang et al., "Emission Control Cost–Effectiveness of Alternative–Fuel Vehicles", Society of Automotive Engineers, Paper 931786, pp. 91–122 (1993).

Wilson, "Turbine Cars", Technology Review, pp. 50–56 (Feb./Mar., 1995).

Kirwan et al., "Fast Start–Up On–Board Gasoline Reformer for Near Zero Emissions in Spark–Ignition Engines", Society of Automotive Engineers 2002 World Congress, Paper No. 2002–01–1011, 14 pgs. (Mar. 4–7, 2002).

Kirwan et al., "Development of a Fast Start–up O Gasoline Reformer for Near Zero Spark–Ignition Engines", Delphi Automotive Systems, pp. 1–21 (2001).

Chandler, "Device May Spark Clean–Running Cars", The Boston Globe, p. E1, 2 pgs. (Jul. 12, 1999).

Simanaitis, "Whither the Automobile?", Road and Track, pp. 98–102 (Sep. 2001).

Shelef et al., "Twenty–five Years after Introduction of Automotive Catalysts: What Next?" Catalysis Today 62. pp. 35–50 (2000).

Stokes et al., "A Gasoline Engine Concept for Improved Fuel Economy—The Lean Boost System", International Falls Fuels and Lubricants Meeting and Exposition, SAE Technical Paper Series, 14 pgs. (Oct. 16–19, 2000).

Tachtler et al., "Fuel Cell Auxiliary Power Unit—Innovation for the Electric Supply of Passenger Cars?", Society of Automotive Engineers, Paper No. 2000–01–0374, pp. 109–117 (2000).

Bromberg et al., "Experimental Evaluation of Sl Engine Operation Supplemented by Hydrogen Rich Gas from a Compact Plasma Boosted Reformer", Massachusetts Institute of Technology Plasma Science and Fusion Center Report, JA–99–32, 9 pgs.(1999).

Bromberg et al., "Compact Plasmatron–Boosted Hydrogen Generation Technology for Vehicular Applications", Int. J. of Hydrogen Energy 24, pp 341–350 (1999).

Bromberg et al., "Emissions Reductions Using Hydrogen from Plasmatron Fuel Converters", Int. J. of Hydrogen Energy 26, pp. 1115–1121 (2001).

Burch et al., "An Investigation of the $NO/H_2/O_2$ Reaction on Noble–Metal Catalysts at Low Temperatures Under Lean–Burn Conditions," Applied Catalysis B: Environmental 23, pp. 115–121 (1999).

Costa et al., "An Investigation of the $NO/H_2/O_2$ (Lean De–$NO_x$) Reaction on a Highly Active and Selective $Pt/La_{0.7}Sr_{0.2}Ce_{0.1}FeO_3$ Catalyst at Low Temperatures", Catalysis 209, pp. 456–471 (2002).

Frank et al., "Kinetics and Mechanism of the Reduction of Nitric Oxides by $H_2$ Under Lean–Burn Conditions on a Pt–Mo–Co/á–$Al_2O_3$ Catalyst", Applied Catalysis B: Environmental 19, pp. 45–57 (1998).

Gore, "Hydrogen A Go–Go", Discover, pp. 92–93, (Jul., 1999).

Koebel et al., "Selective Catalytic Reduction of NO and $NO_2$ at Low Temperatures", Catalysis Today 73, pp. 239–247 (2002).

Nanba et al., "Product Analysis of Selective Catalytic Reduction of $NO_2$ with $C_2H_4$ Over H–Ferrierite", Journal of Catalysis 211, pp. 53–63 (2002).

Nakatani et al., "Simultaneous OM and NOx Reduction System for Diesel Engines", Society of Automotive Engineers 2002 World Congress, Paper No. 2002–01–0957, 10 pgs. (Mar. 4–7, 2002).

* cited by examiner

APPARATUS AND METHOD FOR OPERATING A FUEL REFORMER TO REGENERATE A DPNR DEVICE

This application is a continuation-in-part of commonly assigned, pending U.S. patent application Ser. No. 10/246,118, filed on Sep. 18, 2002 which claims priority to U.S. Provisional Patent Application Ser. No. 60/351,580, filed on Jan. 25, 2002, the entirety of both of which is hereby incorporated by reference.

CROSS REFERENCE

Cross reference is made to copending U.S. Utility patent application Ser. No. 10/345,654 entitled "Method and Apparatus for Removing $NO_X$ and Soot from Engine Exhaust Gas" filed on Jan. 16, 2003, which is assigned to the same assignee as the present application and is hereby incorporated by reference.

FIELD OF THE DISCLOSURE

The present disclosure relates to generally to a fuel reformer, and more particularly to an apparatus and method for operating a fuel reformer to supply reformate gas to a DPNR device.

BACKGROUND OF THE DISCLOSURE

A fuel reformer is operated to reform a hydrocarbon fuel into a reformate gas. In the case of an onboard fuel reformer such as a fuel reformer associated with a vehicle or a stationary power generator, the reformate gas produced by the fuel reformer may be utilized as fuel or fuel additive in the operation of an internal combustion engine. The reformate gas may also be utilized to regenerate or otherwise condition an emission abatement device associated with an internal combustion engine or as a fuel for a fuel cell.

SUMMARY OF THE DISCLOSURE

According to one illustrative embodiment, there is provided a power system having a fuel reformer, an emission abatement device, and a fuel cell. The fuel reformer reforms hydrocarbon fuels so as to produce a reformate gas which is supplied to both the emission abatement device and the fuel cell.

According to a more specific illustrative embodiment, there is provided a vehicle system of an on-highway truck having a fuel reformer configured to reform hydrocarbon fuel into a reformate gas, an emission abatement device for treating the emissions from an internal combustion engine, and a fuel cell for generating electrical power. The reformate gas from the fuel reformer is supplied to both the emission abatement device and the fuel cell. In such a way, the reformate gas may be utilized to regenerate or otherwise condition the emission abatement device during operation of the engine, while also being utilized to operate the fuel cell during inoperation of the engine. Electrical power from the fuel cell may be used to power an electrically-powered cab heating and cooling assembly with the need to idle the engine.

According to another illustrative embodiment, a single fuel reformer is utilized to regenerate or otherwise condition a combination emission abatement assembly having a number of different devices for treating a number of different exhaust effluents from the exhaust gas of an internal combustion engine.

According to a more specific illustrative embodiment, the combination emission abatement assembly has a $NO_X$ trap and a soot particulate filter. In such a case, the reformate gas from the fuel reformer is used to selectively regenerate both the $NO_X$ trap and the soot particulate filter.

According to another illustrative embodiment, a fuel reformer is operated in different modes of operation to generate and supply different quantities and/or compositions of reformate gas to different components.

According to a more specific exemplary embodiment, the fuel reformer is operated in one mode of operation to generate and supply a particular quantity and/or composition of reformate gas to a $NO_X$ trap, and then is operated in a different mode of operation to generate and supply and different quantity and/or composition of reformate gas to a soot particulate filter. In a similar manner, the fuel reformer is operated in one mode of operation to generate and supply a particular quantity and/or composition of reformate gas to a fuel cell, and then is operated in a different mode of operation to generate and supply and different quantity and/or composition of reformate gas to an emission abatement device.

According to another illustrative embodiment, a fuel reformer is operated to generate and supply reformate gas to one or more DPNR devices associated with an emission abatement assembly.

According to a more specific exemplary embodiment, an emission abatement assembly includes a pair of DPNR devices arranged in separate parallel flow paths. The fuel reformer may be operated to regenerate the first DPNR device while the second DPNR device treats engine exhaust gas (i.e., traps $NO_X$ and particulate soot in the exhaust gas). Once the first DPNR device has been regenerated, the fuel reformer may be operated to regenerate the second DPNR device while the first device treats engine exhaust gas.

The above and other features of the present disclosure will become apparent from the following description and the attached drawings.

DETAILED DESCRIPTION OF THE DRAWINGS

Figure 1:
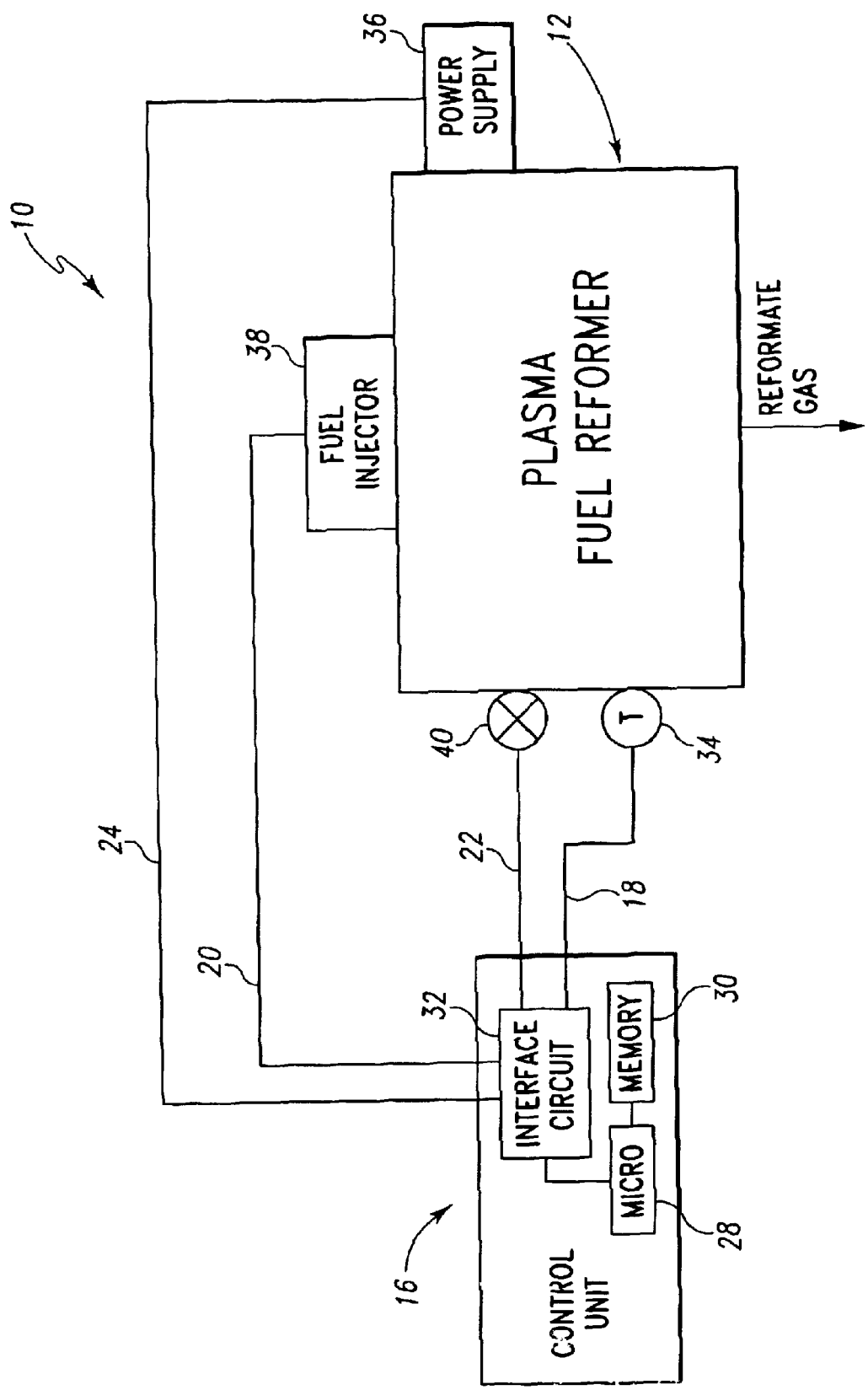
FIG. 1 is a simplified block diagram of a fuel reforming assembly having a plasma fuel reformer under the control of an electronic control unit.

As will herein be described in more detail, a fuel reformer, according to the concepts of the present disclosure, may be utilized to generate and supply a reformate gas to both a fuel cell and an emission abatement device. In such a way, the fuel reformer may be used to sustain operation of the fuel cell, while also regenerating or otherwise conditioning the emission abatement device. In the case of when the fuel reformer is a component of a vehicle system (e.g., an on-highway truck) or a stationary power generator, the fuel reformer allows for the treatment of exhaust gases from the internal combustion engine of the vehicle or power generator during operation of the engine, while also allowing for the production of electrical power by the fuel cell during inoperation of the engine (i.e., when the engine is not running).

A fuel reformer, according to further concepts of the present disclosure, may also be utilized to regenerate or otherwise condition a combination emission abatement assembly having a number of different devices for treating a number of different exhaust effluents from the exhaust gas of an internal combustion engine. For example, the fuel reformer is operated to generate and supply a reformate gas to an emission abatement assembly having a $NO_X$ trap and a soot particulate filter. In such a case, the reformate gas from the fuel reformer is used to selectively regenerate both the $NO_X$ trap and the soot particulate filter.

A fuel reformer, according to additional concepts of the present disclosure, may be operated in different modes of operation to generate and supply different quantities and/or compositions of reformate gas to different components. For example, in the case of when the fuel reformer is operated to generate and supply reformate gas to both a $NO_X$ trap and a particulate filter, the fuel reformer may be operated in one mode of operation to generate and supply a particular quantity and/or composition of reformate gas to the $NO_X$ trap, and then be operated in a different mode of operation to generate and supply a different quantity and/or composition of reformate gas to the particulate filter. A similar control scheme may also be utilized in the case of use of the fuel reformer to generate and supply reformate gas to both a fuel cell and an emission abatement device. In particular, the fuel reformer may be operated in one mode of operation to generate and supply a particular quantity and/or composition of reformate gas to the fuel cell, and then be operated in a different mode of operation to generate and supply a different quantity and/or composition of reformate gas to the emission abatement device.

A fuel reformer, according to further concepts of the present disclosure, may also be utilized to generate and supply reformate gas to one or more DPNR devices associated with an emission abatement assembly. For example, an emission abatement assembly may be configured to include a pair of DPNR devices arranged in separate parallel flow paths. The fuel reformer may be operated to regenerate the first DPNR device of the pair while the second DPNR device of the pair treats engine exhaust gas (i.e., traps $NO_X$ and particulate soot in the exhaust gas). Once the first DPNR device has been regenerated, the fuel reformer may be operated to regenerate the second DPNR device while the first device treats engine exhaust gas.

The fuel reformer described herein may be embodied as any type of fuel reformer such as, for example, a catalytic fuel reformer, a thermal fuel reformer, a steam fuel reformer, or any other type of partial oxidation fuel reformer. The fuel reformer of the present disclosure may also be embodied as a plasma fuel reformer. A plasma fuel reformer uses plasma to convert a mixture of air and hydrocarbon fuel into a reformate gas which is rich in, amongst other things, hydrogen gas and carbon monoxide. Systems including plasma fuel reformers are disclosed in U.S. Pat. No. 5,425,332 issued to Rabinovich et al.; U.S. Pat. No. 5,437,250 issued to Rabinovich et al.; U.S. Pat. No. 5,409,784 issued to Bromberg et al.; and U.S. Pat. No. 5,887,554 issued to Cohn, et al., the disclosures of each of which is hereby incorporated by reference. Additional examples of systems including plasma fuel reformers are disclosed in copending U.S. patent application Ser. No. 10/158,615 entitled "Low Current Plasmatron Fuel Converter Having Enlarged Volume Discharges" which was filed on May 30, 2002 by A. Rabinovich, N. Alexeev, L. Bromberg, D. Cohn, and A. Samokhin, along with copending U.S. patent application Ser. No. 10/411,917 entitled "Plasmatron Fuel Converter Having Decoupled Air Flow Control" which was filed on Apr. 11, 2003 by A. Rabinovich, N. Alexeev, L. Bromberg, D. Cohn, and A. Samokhin, the disclosures of both of which are hereby incorporated by reference.

For purposes of the following description, the concepts of the present disclosure will herein be described in regard to a plasma fuel reformer. However, as described above, the fuel reformer of the present disclosure may be embodied as any type of fuel reformer, and the claims attached hereto should not be interpreted to be limited to any particular type of fuel reformer unless expressly defined therein.

Figure 2:
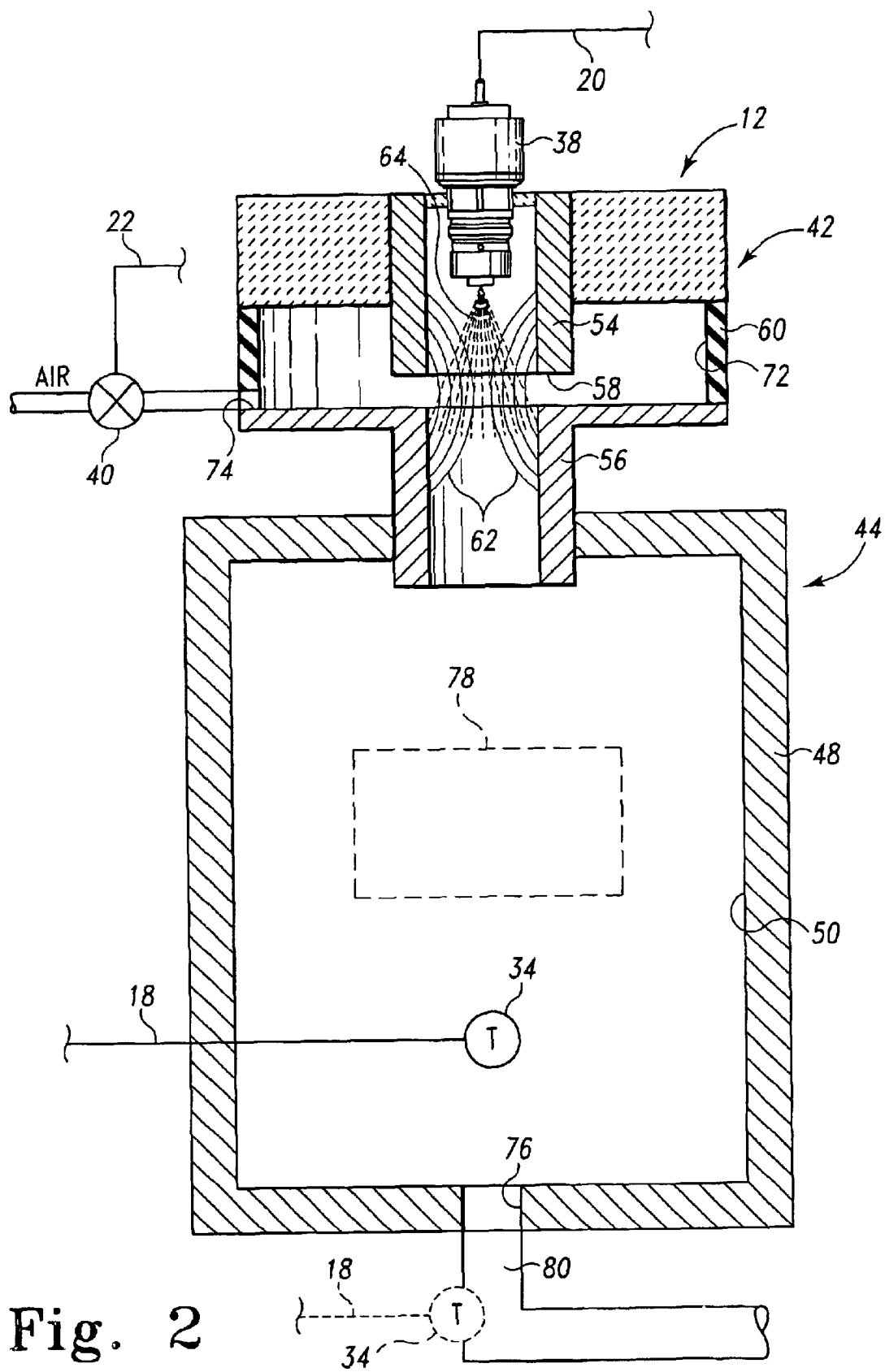
FIG. 2 is a diagrammatic cross sectional view of the plasma fuel reformer of FIG. 1.

Referring now to FIGS. 1 and 2, there is shown an exemplary embodiment of a plasma fuel reforming assembly 10 having a plasma fuel reformer 12 and a control unit 16. The plasma fuel reformer 12 reforms (i.e., converts) hydrocarbon fuels into a reformate gas that includes, amongst other things, hydrogen and carbon monoxide. As such, the plasma fuel reformer 12, as described further herein, may be used in the construction of an onboard fuel reforming system of a vehicle or a stationary power generator. In such a way, the reformate gas produced by the onboard plasma fuel reformer 12 may be utilized as fuel or fuel additive in the operation of an internal combustion engine thereby increasing the efficiency of the engine while also reducing emissions produced by the engine. The reformate gas produced by the onboard plasma fuel reformer 12 may also be utilized to regenerate or otherwise condition an emission abatement device associated with the internal combustion engine. In addition, if the vehicle or the stationary power generator is equipped with a fuel cell such as, for example, an auxiliary power unit (APU), the reformate gas from the onboard plasma fuel reformer 12 may also be used as a fuel for the fuel cell.

As shown in FIG. 2, the plasma fuel reformer 12 includes a plasma-generating assembly 42 and a reactor 44. The reactor 44 includes a reactor housing 48 having a reaction chamber 50 defined therein. The plasma-generating assembly 42 is secured to an upper portion of the reactor housing 48. The plasma-generating assembly 42 includes an upper electrode 54 and a lower electrode 56. The electrodes 54, 56 are spaced apart from one another so as to define an electrode gap 58 therebetween. An insulator 60 electrically insulates the electrodes from one another.

The electrodes 54, 56 are electrically coupled to an electrical power supply 36 (see FIG. 1) such that, when energized, an electrical current is supplied to one of the electrodes thereby generating a plasma arc 62 across the electrode gap 58 (i.e., between the electrodes 54, 56). A fuel input mechanism such as a fuel injector 38 injects a hydrocarbon fuel 64 into the plasma arc 62. The fuel injector 38 may be any type of fuel injection mechanism which injects a desired amount of fuel into plasma-generating assembly 42. In certain configurations, it may be desirable to atomize the fuel prior to, or during, injection of the fuel into the plasma-generating assembly 42. Such fuel injector assemblies (i.e., injectors which atomize the fuel) are commercially available.

As shown in FIG. 2, the plasma-generating assembly 42 has an annular air chamber 72. Pressurized air is advanced into the air chamber 72 through an air inlet 74 and is thereafter directed radially inwardly through the electrode gap 58 so as to "bend" the plasma arc 62 inwardly. Such bending of the plasma arc 62 ensures that the injected fuel 64 is directed through the plasma arc 62. Such bending of the plasma arc 62 also reduces erosion of the electrodes 56, 58. Moreover, advancement of air into the electrode gap 58 also produces a desired mixture of air and fuel ("air/fuel mixture"). In particular, the plasma reformer 12 reforms or otherwise processes the fuel in the form of a mixture of air and fuel. The air-to-fuel ratio of the air/fuel mixture being reformed by the fuel reformer is controlled via control of the fuel injector 38 and an air inlet valve 40. The air inlet valve 40 may be embodied as any type of electronically-controlled air valve. The air inlet valve 40 may be embodied as a discrete device, as shown in FIG. 2, or may be integrated into the design of the plasma fuel reformer 12. In either case, the air inlet valve 40 controls the amount of air that is introduced into the plasma-generating assembly 42 thereby controlling the air-to-fuel ratio of the air/fuel mixture being processed by the plasma fuel reformer 12.

The lower electrode 56 extends downwardly into the reactor housing 48. As such, gas (either reformed or partially reformed) exiting the plasma arc 62 is advanced into the reaction chamber 50. A catalyst 78 may be positioned in the reaction chamber 50. The catalyst 78 completes the fuel reforming process, or otherwise treats the gas, prior to exit of the reformate gas through a gas outlet 76. In particular, some or all of the gas exiting the plasma-generating assembly 42 may only be partially reformed, and the catalyst 78 is configured to complete the reforming process (i.e., catalyze a reaction which completes the reforming process of the partially reformed gas exiting the plasma-generating assembly 42). The catalyst 78 may be embodied as any type of catalyst that is configured to catalyze such reactions. In one exemplary embodiment, the catalyst 78 is embodied as substrate having a precious metal or other type of catalytic material disposed thereon. Such a substrate may be constructed of ceramic, metal, or other suitable material. The catalytic material may be, for example, embodied as platinum, rhodium, palladium, including combinations thereof, along with any other similar catalytic materials. As shall be discussed below in greater detail, the plasma fuel reformer 12 may be embodied without the catalyst 78.

As shown in FIG. 2, the plasma fuel reformer 12 has a temperature sensor 34 associated therewith. The temperature sensor 34 is used as a feedback mechanism to determine the temperature of a desired structure of the plasma fuel reformer 12 or the gas advancing therethrough. For example, the temperature sensor 34 may be used to measure the temperature of the reformate gas being produced by the plasma fuel reformer 12, the ambient temperature within the reaction chamber 50, the temperature of the catalyst 78, etcetera. The temperature sensor 34 may be located in any number of locations. In particular, as shown in solid lines, the temperature sensor 34 may be positioned within the reaction chamber 50 at location in operative contact with the a structure (e.g., the catalyst 78 or the walls of the reaction chamber 50) or a substance (e.g., the gas in the reaction chamber 50). To do so, the temperature sensor 34 may be positioned in physical contact with the structure or substance, or may be positioned a predetermined distance away from the structure or out of the flow of the substance, depending on the type and configuration of the temperature sensor.

Alternatively, the temperature of the desired structure or substance may be determined indirectly. In particular, as shown in phantom, the temperature sensor 34 may be positioned so as to sense the temperature of the reformate gas advancing through the reaction chamber 50 or a gas conduit 80 subsequent to being exhausted through the outlet 76. Such a temperature reading may be utilized to calculate the temperature of another structure such as, for example, the catalyst 78 or the reactor housing 48. Conversely, the temperature sensor 34 may be positioned to sense the temperature of the reactor housing 48 with such a temperature reading then being correlated to the temperature of the reformate gas. In any such case, an indirect temperature sensed by the temperature sensor 34 may be correlated to a desired temperature.

As shown in FIG. 1, the plasma fuel reformer 12 and its associated components are under the control of the control unit 16. In particular, the temperature sensor 34 is electrically coupled to the electronic control unit 16 via a signal line 18, the fuel injector 38 is electrically coupled to the electronic control unit 16 via a signal line 20, the air inlet valve 40 is electrically coupled to the electronic control unit 16 via a signal line 22, and the power supply 36 is electrically coupled to the electronic control unit 16 via a signal line 24. Moreover, as will herein be described in greater detail, a number of other components associated with the plasma fuel reformer 12 may also be under the control of the control unit 16, and, as a result, electrically coupled thereto. For example, a flow diverter valve for selectively diverting a flow of reformate gas from the plasma fuel reformer 12 between any number of components may be under the control of the control unit 16. Similarly, a flow diverter valve for selectively diverting a flow of exhaust gas from an internal combustion engine between any number of components may also be under the control of the control unit 16.

Although the signal lines 18, 20, 22, 24 (and any of the signal lines used to couple other devices to the control unit) are shown schematically as a single line, it should be appreciated that the signal lines may be configured as any type of signal carrying assembly which allows for the transmission of electrical signals in either one or both directions between the electronic control unit 16 and the corresponding component. For example, any one or more of the signal lines 18, 20, 22, 24 (or any other signal line disclosed herein) may be embodied as a wiring harness having a number of signal lines which transmit electrical signals between the electronic control unit 16 and the corresponding component. It should be appreciated that any number of other wiring configurations may also be used. For example, individual signal wires may be used, or a system utilizing a signal multiplexer may be used for the design of any one or more of the signal lines 18, 20, 22, 24 (or any other signal line). Moreover, the signal lines 18, 20, 22, 24 may be integrated such that a single harness or system is utilized to electrically couple some or all of the components associated with the plasma fuel reformer 12 to the electronic control unit 16.

The electronic control unit 16 is, in essence, the master computer responsible for interpreting electrical signals sent by sensors associated with the plasma fuel reformer 12 and for activating electronically-controlled components associated with the plasma fuel reformer 12 in order to control the plasma fuel reformer 12, the flow of reformate gas exiting therefrom, and, in some cases, an exhaust gas flow from an internal combustion engine. For example, the electronic control unit 16 of the present disclosure is operable to, amongst many other things, determine the beginning and end of each injection cycle of fuel into the plasma-generating assembly 42, calculate and control the amount and ratio of air and fuel to be introduced into the plasma-generating assembly 42, determine the temperature of the reformer 12 or the reformate gas, determine the power level to supply to the plasma fuel reformer 12, determine which component (e.g., a $NO_X$ trap, a particulate filter, or a fuel cell) to supply the reformate gas to, determine the composition or quantity of reformate gas to be generated and supplied to a particular component.

To do so, the electronic control unit 16 includes a number of electronic components commonly associated with electronic units which are utilized in the control of electromechanical systems. For example, the electronic control unit 16 may include, amongst other components customarily included in such devices, a processor such as a microprocessor 28 and a memory device 30 such as a programmable read-only memory device ("PROM") including erasable PROM's (EPROM's or EEPROM's). The memory device 30 is configured to store, amongst other things, instructions in the form of, for example, a software routine (or routines) which, when executed by the processor 28, allows the electronic control unit 16 to control operation of the plasma fuel reformer 12.

The electronic control unit 16 also includes an analog interface circuit 32. The analog interface circuit 32 converts the output signals from the various fuel reformer sensors (e.g., the temperature sensor 34) or other sensors associated with the components associated with the plasma fuel reformer 12 into a signal which is suitable for presentation to an input of the microprocessor 28. In particular, the analog interface circuit 32, by use of an analog-to-digital (A/D) converter (not shown) or the like, converts the analog signals generated by the sensors into a digital signal for use by the microprocessor 28. It should be appreciated that the A/D converter may be embodied as a discrete device or number of devices, or may be integrated into the microprocessor 28. It should also be appreciated that if any one or more of the sensors associated with the plasma fuel reformer 12 generate a digital output signal, the analog interface circuit 32 may be bypassed.

Similarly, the analog interface circuit 32 converts signals from the microprocessor 28 into an output signal which is suitable for presentation to the electrically-controlled components associated with the plasma fuel reformer 12 (e.g., the fuel injector 38, the air inlet valve 40, the power supply 36, or other system components such as a gas flow diverter valve or the like). In particular, the analog interface circuit 32, by use of a digital-to-analog (D/A) converter (not shown) or the like, converts the digital signals generated by the microprocessor 28 into analog signals for use by the electronically-controlled components associated with the fuel reformer 12 such as the fuel injector 38, the air inlet valve 40, or the power supply 36. It should be appreciated that, similar to the A/D converter described above, the D/A converter may be embodied as a discrete device or number of devices, or may be integrated into the microprocessor 28. It should also be appreciated that if any one or more of the electronically-controlled components associated with the plasma fuel reformer 12 operate on a digital input signal, the analog interface circuit 32 may be bypassed.

Hence, the electronic control unit 16 may be operated to control operation of the plasma fuel reformer 12 and components associated therewith. In particular, the electronic control unit 16 executes a routine including, amongst other things, a closed-loop control scheme in which the electronic control unit 16 monitors the outputs from a number of sensors in order to control the inputs to the electronically-controlled components associated therewith. To do so, the electronic control unit 16 communicates with the sensors associated with the fuel reformer and the system in which it is being utilized in order to determine, amongst numerous other things, the amount, temperature, and/or pressure of air and/or fuel being supplied to the plasma fuel reformer 12, the amount of hydrogen and/or oxygen in the reformate gas, the temperature of the reformer or the reformate gas, the composition of the reformate gas, the saturation level of an emission abatement device (e.g., a $NO_X$ trap or particulate filter), etcetera. Armed with this data, the electronic control unit 16 performs numerous calculations each second, including looking up values in preprogrammed tables, in order to execute algorithms to perform such functions as determining when or how long the fuel reformer's fuel injector or other fuel input device is opened, controlling the power level input to the fuel reformer, controlling the amount of air advanced through air inlet valve, controlling the position of a flow diverter valve responsible for directing the flow of reformate gas or exhaust gas from one component to the other, determining the quantity and/or composition of reformate gas to generate and deliver to a particular component, etcetera.

Figure 3:
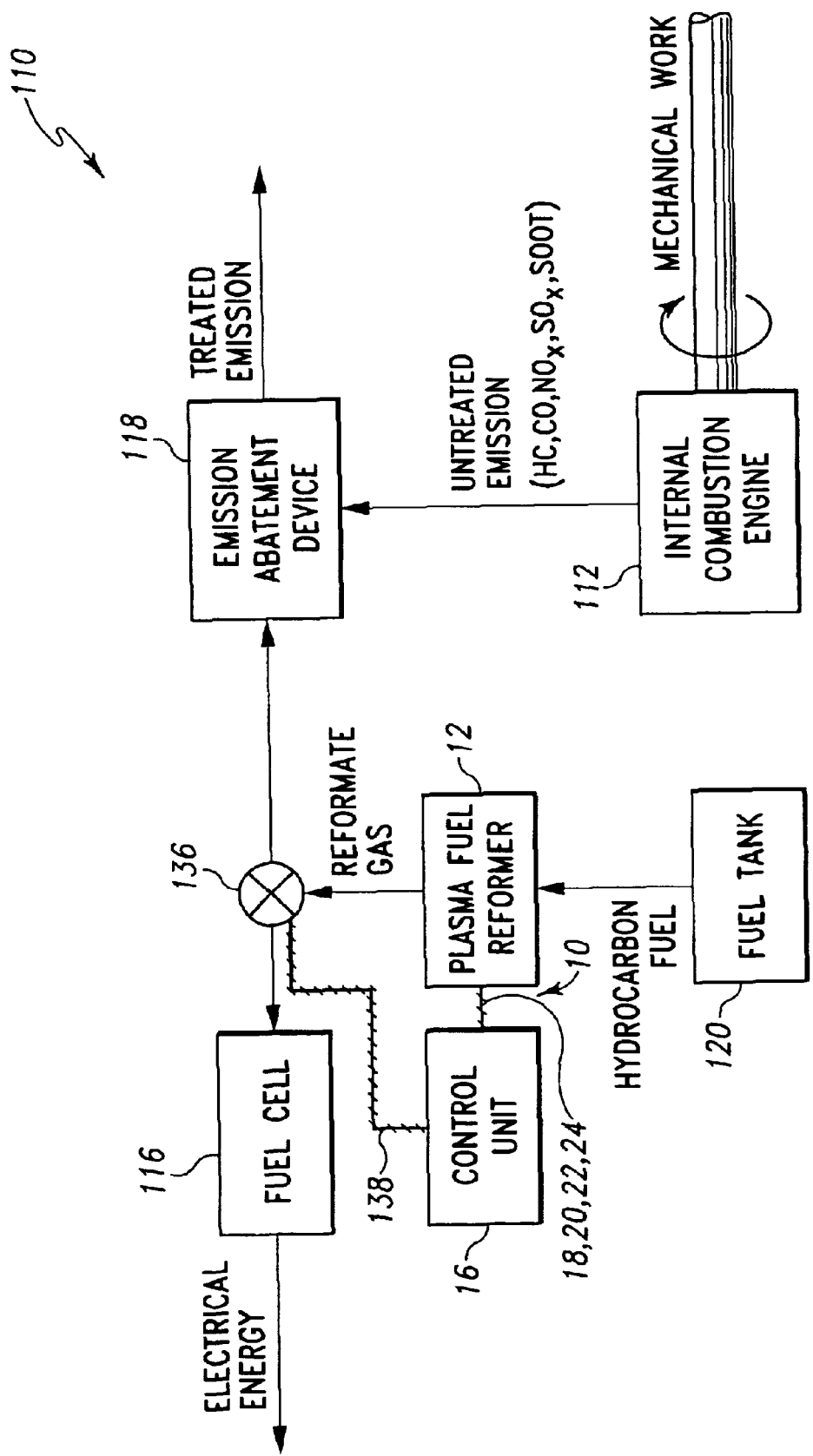
FIG. 3 is a simplified block diagram of a power system.

Referring now to FIG. 3, there is shown a power system 110 having an internal combustion engine 112 such as a diesel engine, the fuel reformer system 10, a fuel cell 116, and an emission abatement device 118. Hydrocarbon fuel from a fuel tank 120 is supplied to the plasma fuel reformer 12. The hydrocarbon fuel in the fuel tank 120 may be the same hydrocarbon fuel being combusted by the engine 112 (e.g., gasoline or diesel fuel), or, alternatively, may be a type of hydrocarbon fuel which is distinct from the engine's fuel.

As described above, the plasma fuel reformer 12 of the fuel reformer assembly 10 reforms hydrocarbon fuel into a reformate gas such as gas rich in hydrogen and carbon monoxide. The reformate gas is then supplied to a number of other components associated with the power system 110. For example, the plasma fuel reformer 12 may be used to supply reformate gas to the fuel cell 116. Specifically, hydrocarbon fuel from the fuel tank 120 may be reformed by the plasma fuel reformer 12 into a reformate gas which is input into the fuel cell 116. The fuel cell 116 of the power system 110 may be provided as any type of fuel cell. For example, the fuel cell 116 may be embodied as an alkaline fuel cell (AFC), a phosphoric acid fuel cell (PAFC), a proton exchange membrane fuel cell (PEMFC), a solid oxide fuel cell (SOFC), a molten carbonate fuel cell (MCFC), or any other type of fuel cell.

The fuel cell 116 processes the reformate gas from the plasma fuel reformer 12 to create electrical energy which is used in the operation of the power system 110 or other components. For example, electrical energy generated by the fuel cell 116 may be consumed by components associated with the power system. For instance, electrical energy generated by the fuel cell 116 may be used for operation of a number of electrical accessories such as systems electronics or the like. It should appreciated that the fuel cell 116 may be operated in conjunction with one or more batteries (not shown) to store electrical energy prior to consumption by electrical components associated with the system.

The reformate gas may also be supplied to the emission abatement device 118. In such a case, the hydrogen-rich gas may be used to regenerate a chemical catalyst or absorber which remove certain effluents (e.g., HC, CO, $NO_X$, $SO_X$, and in the case of a diesel engine, carbon-based particulate or "soot") from the exhaust gases emitted from the internal combustion engine 112. Specifically, the emission abatement device 118 may include one or more catalytic converters or similar devices to reburn or otherwise treat any unburned gases in the exhaust gases. As such, the emission abatement device 118 may include platinum, rhodium, palladium, or other similar materials which are catalysts for the chemical reaction needed to burn off or otherwise treat any unburned hydrocarbons and carbon monoxide by turning them into water vapor, carbon dioxide and other less toxic gases. Reformate gas from the plasma fuel reformer 12 may be utilized to condition the catalyst or otherwise facilitate such an abatement process.

The emission abatement device 118 may also include one or more absorbers, traps, filters, or similar devices for trapping and removing compounds such as oxides of nitrogen ($NO_X$), oxides of sulfur ($SO_X$), and/or soot. As described in greater detail herein in regard to FIGS. 5 and 6, additional oxidation catalysts may be used in conjunction with the traps of the emission abatement device 118 to oxidize certain compounds being exhausted from the traps (e.g., $H_2S$). Reformate gas from the plasma fuel reformer 12 may be used to regenerate such absorbers, traps, and filters. In particular, absorbers, traps, and filters undergo a regeneration process during operation thereof in which the compound trapped in the absorber, trap, or filter is purged therefrom. Reformate gas from the plasma fuel reformer 12 may be supplied to the absorber, trap, or filter in order to facilitate such a regeneration process.

A $NO_X$ trap used in the construction of the emission abatement device 118 may be any type of commercially available $NO_X$ trap. In the case of when engine 112 is embodied as a diesel engine, the $NO_X$ trap is embodied as a lean $NO_X$ trap so as to facilitate the trapping and removal of $NO_X$ in the lean conditions associated with diesel exhaust gases. Specific examples of $NO_X$ traps which may be used in the construction of the emission abatement device 118 include, but are not limited to, $NO_X$ traps commercially available from, or $NO_X$ traps constructed with materials commercially available from, EmeraChem, LLC of Knoxville, Tenn. (formerly known as Goal Line Environmental Technologies, LLC of Knoxville, Tenn.).

A soot particulate filter used in the construction of the emission abatement device 118 may be any type of commercially available particulate filter. For example, the soot particulate filter may be embodied as any known exhaust particulate filter such as a "deep bed" or "wall flow" filter. Deep bed filters may be embodied as metallic mesh filters, metallic or ceramic foam filters, ceramic fiber mesh filters, and the like. Wall flow filters, on the other hand, may be embodied as a cordierite or silicon carbide ceramic filter with alternating channels plugged at the front and rear of the filter thereby forcing the gas advancing therethrough into one channel, through the walls, and out another channel. Moreover, the soot particulate filter may also be impregnated with a catalytic material such as, for example, a precious metal catalytic material.

Figure 7:
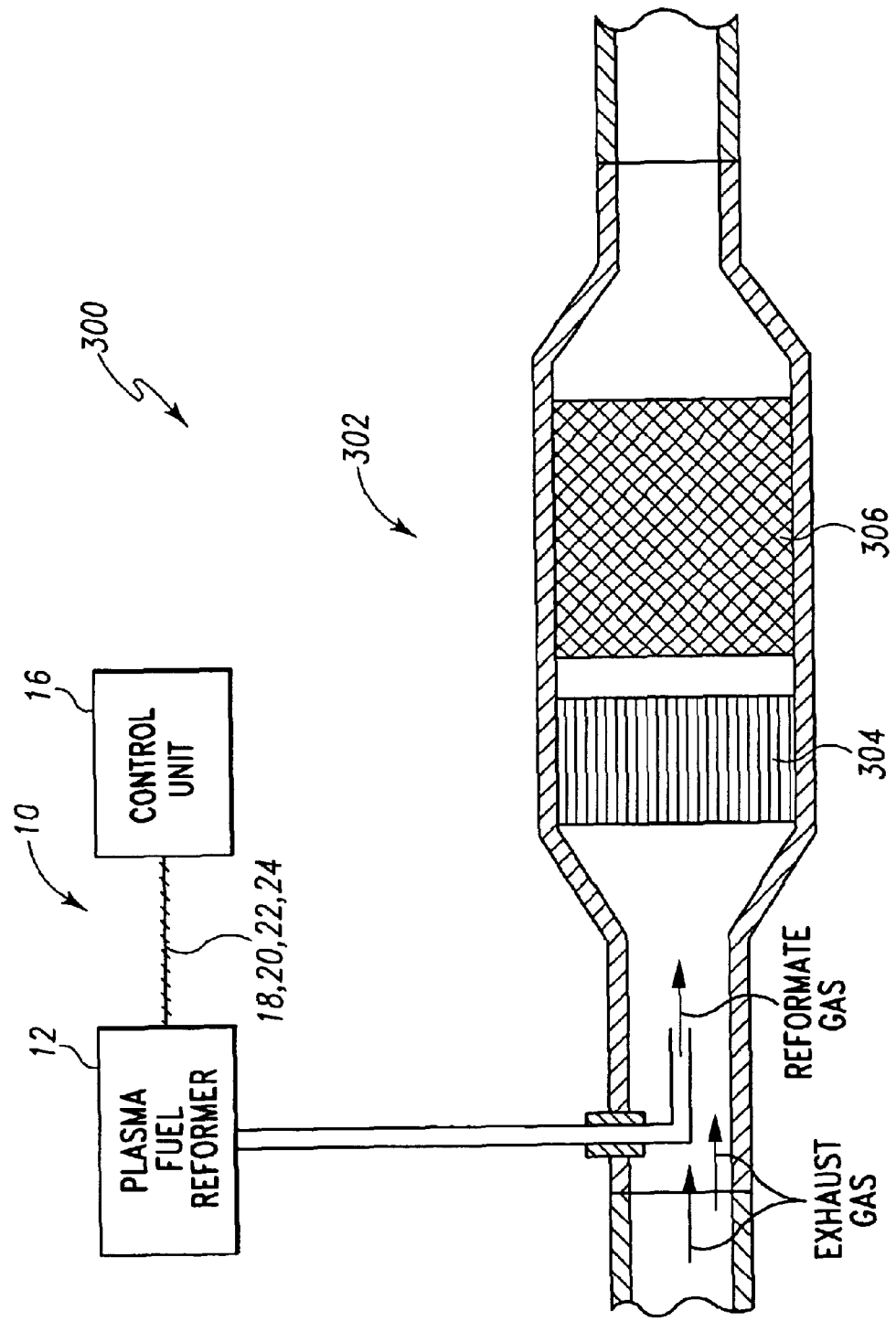
FIG. 7 is a diagrammatic cross sectional view of a soot particulate filter that may be utilized in the construction of the power systems of FIGS. 3–6.

The soot particulate filter for use as the emission abatement device 118 may also be embodied as any of the devices described in copending, commonly assigned U.S. Provisional Patent Application Ser. No. 60/375,134 entitled "Apparatus and Method for Regenerating a Particulate Filter of an Exhaust System of an Internal Combustion Engine" filed on Apr. 24, 2002 by Rudolf M. Smaling, the entirety of which is hereby incorporated by reference. As shown in FIG. 7, one exemplary emission abatement device 300 constructed according to the teachings of the above-incorporated provisional patent application, may be configured as a particulate filter assembly 302 having a catalyst 304 and a soot particulate filter 306 positioned downstream from catalyst 304. The catalyst 304 may be spaced apart from the soot filter 306 by a predetermined distance (as shown in FIG. 7), may be positioned in contact with the soot particulate filter 306, or may even be fabricated as a common structure with the soot particulate filter 306 (e.g., a common structure having a catalyst portion positioned upstream of a filter portion).

The catalyst 304 may be embodied as any type of catalyst that is configured to catalyze the herein described reactions. In one exemplary embodiment, the catalyst 304 is embodied as substrate having a precious metal or other type of catalytic material disposed thereon. Such a substrate may be constructed of ceramic, metal, or other suitable material. The catalytic material may be, for example, embodied as platinum, rhodium, palladium, including combinations thereof, along with any other similar catalytic materials.

The soot particulate filter 306, on the other hand, traps soot or other particulates present in the untreated exhaust gases from the engine 112. The soot particulate filter 306 may be embodied as any known exhaust particulate filter such as the "deep bed" or "wall flow" filters described above. Similarly to as described above, the soot particulate filter 306 may also be impregnated with a catalytic material such as, for example, a precious metal catalytic material.

During a regeneration cycle, reformate gas from the plasma fuel reformer 12 is advanced into contact with the catalyst 304 to catalyze an oxidation reaction between the oxygen in the exhaust gas of the engine 112 and the reformate gas. Specifically, when the reformate gas is advanced into contact with the catalyst 304 in the presence of exhaust gas, the catalyst 304 catalyzes an oxidation reaction which converts the hydrogen gas present in the reformate gas and the oxygen present in the exhaust gases into, amongst other things, water. Moreover, the catalyst catalyzes an oxidation reaction which converts the carbon monoxide present in the reformate gas and the oxygen present in the exhaust gases into carbon dioxide. Both of these oxidation reactions are highly exothermic, and, as a result, produce heat that is transferred to the downstream-positioned soot particulate filter 306. The heat, which may illustratively be in the range of 600–650 degrees Celsius, ignites and burns soot particles trapped in the particulate filter 306 thereby regenerating the filter 306.

Figure 8:
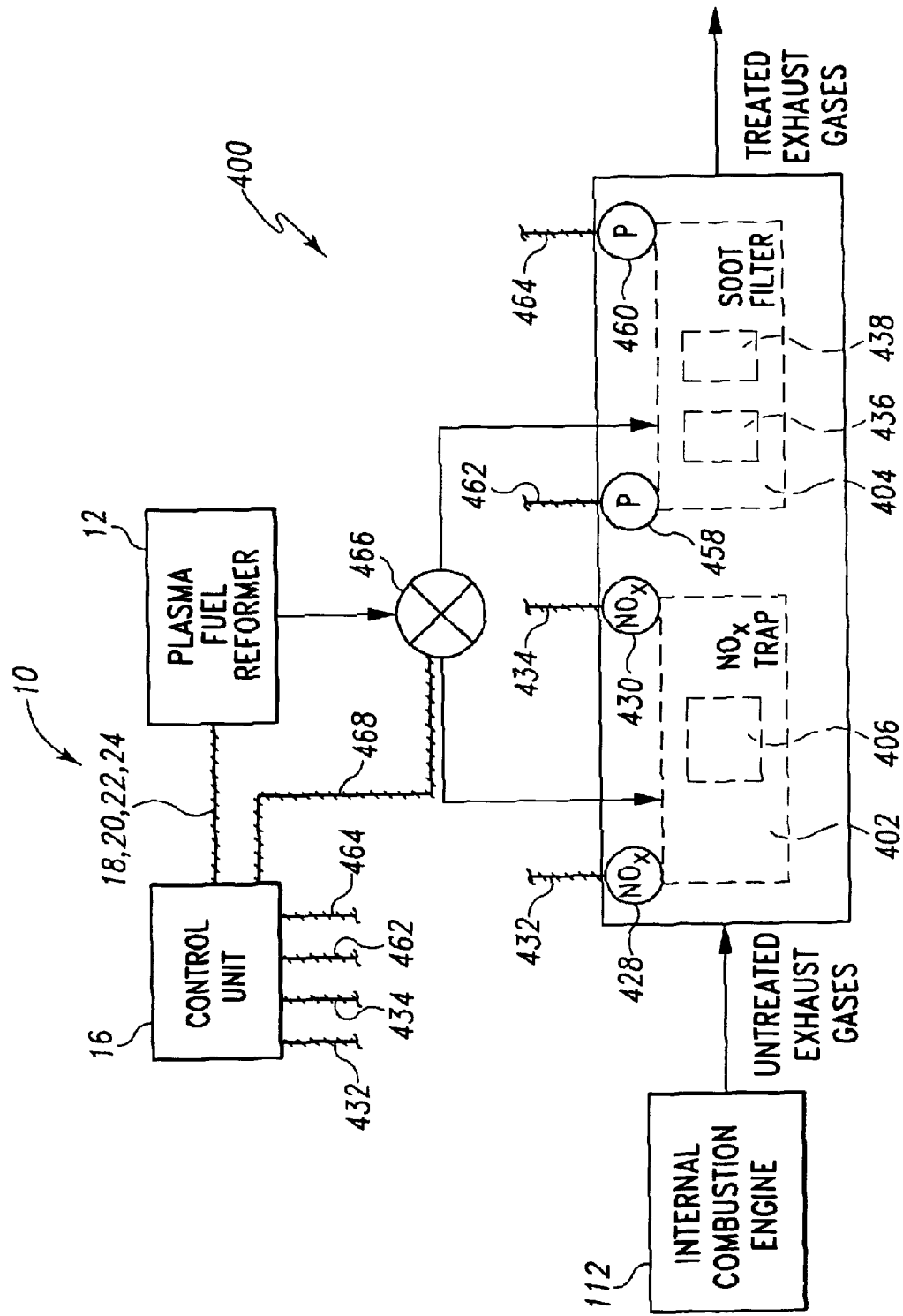
FIG. 8 is a simplified block diagram of a combination emission abatement assembly.
Figure 9:
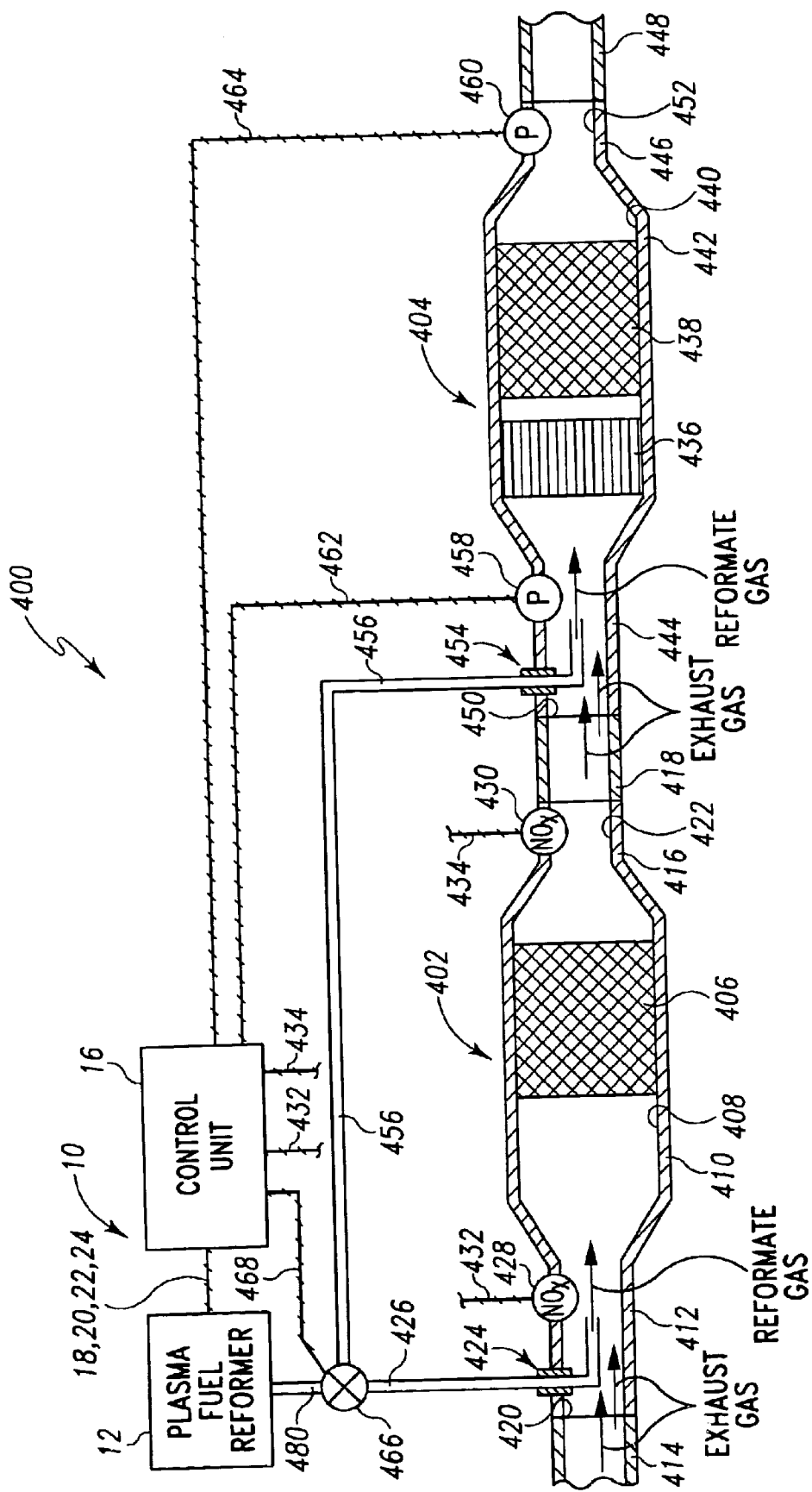
FIG. 9 is a diagrammatic cross sectional view of the combination emission abatement assembly of FIG. 8.

As shown in FIGS. 8 and 9, the emission abatement device 118 may also be embodied as a combination emission abatement assembly 400 having devices for treating multiple different compounds present in the exhaust stream. In particular, as will herein be described in greater detail in regard to FIGS. 8 and 9, the combination emission abatement assembly 400 may be embodied to include both a $NO_X$ trap and a soot particulate filter assembly for trapping and removing both $NO_X$ and soot from the engine's exhaust gases. In such a case, regeneration of both devices is facilitated by use of the plasma fuel reformer 12.

Figure 4:
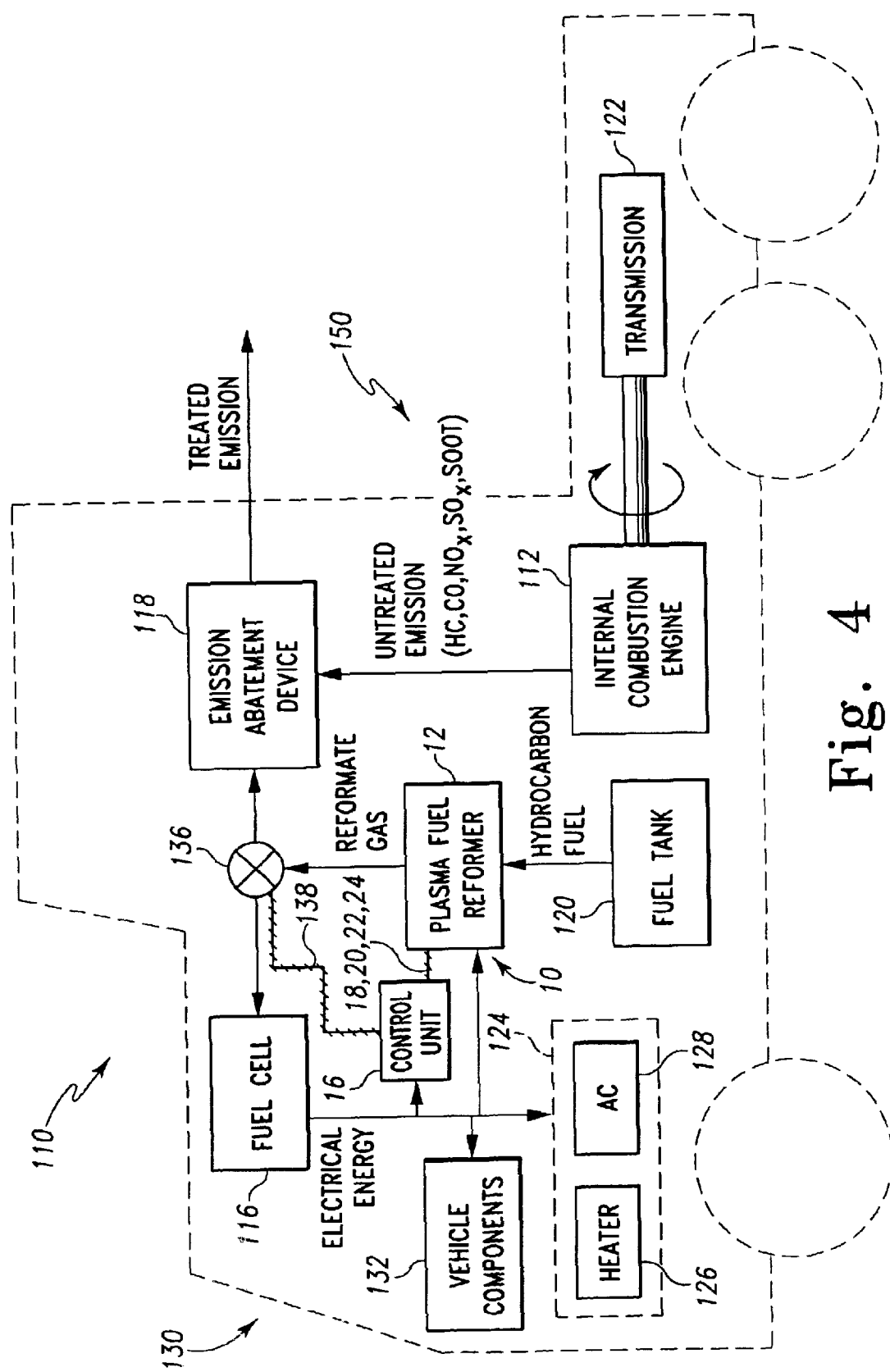
FIG. 4 is a simplified block diagram of the power system of FIG. 3 as used in the construction of a vehicle.

Referring now to FIG. 4, there is shown a specific exemplary implementation of the power system 110. Specifically, the power system 110, as embodied in FIG. 4, is used in the design of a vehicle such as an on-highway truck 150. As such, the output of the engine 112 drives or otherwise mechanically powers a transmission 122 associated with the truck 150.

In the exemplary embodiment shown in FIG. 4, the fuel cell 116 may be operated to provide electrical power to a number of components associated with the truck 150. For example, the fuel cell 116 may be operated to provide electrical power to a heating and cooling system 124. Specifically, the truck 150 may be equipped with an electrically-powered heater 126 and/or air conditioning unit 128 which are operated on electrical power generated by the fuel cell 116 to heat and cool a passenger compartment 130 (e.g., a cab) associated with the truck 150.

Other vehicle components 132 associated with the truck 150 may also be operated on electrical power generated by the fuel cell 116. Such components 132 may include the truck's exterior and interior lighting, accessories (e.g., radio), electronic control systems (e.g., engine control module, brake control module, etcetera), engine devices (e.g., fuel pump, fuel injector system, etcetera), or the like. It should also be appreciated that electrical power from the fuel cell 116 may also be used to operate the plasma fuel reformer 12, if need be.

As described herein, the fuel cell 116 may be configured to provide electrical power to the entire truck 150 much in the same way power is provided in a conventional truck design by an alternator (and associated batteries). However, in the case of use of the fuel cell 116 to provide electrical power to the truck 150, the internal combustion engine 112 does not have to be operated (i.e., the engine 112 does not need to be running) in order to provide sustained amounts of electrical power in the manner it would be if power were to be provided through a conventional alternator arrangement.

Reformate gas from the plasma fuel reformer 12 may be generated and supplied to the emission abatement device 118 during operation of the engine 112. Specifically, during operation of the internal combustion engine 112, the electronic control unit 16 controls operation of the plasma fuel reformer 12 such that reformate gas is generated and supplied to the emission abatement device 118 so as to selectively regenerate or otherwise treat the emission abatement device 118 during operation of the engine 112. However, during inoperation of the engine (i.e., during periods of time when the engine is not running), the electronic control unit 16 controls operation of the plasma fuel reformer 12 such that reformate gas is generated and supplied to the fuel cell 116 so as to allow for the production of electrical energy by the fuel cell 116. In such a case, mechanical output from the engine 112 is not necessary to provide sustained levels of power thereby facilitating operation of electrical accessories (e.g., the heating and cooling system 124) without the need to idle or otherwise operate the engine 112.

An electronically-controlled flow diverter valve 136 is utilized to selectively direct the flow of reformate gas from the plasma fuel reformer 12 between the fuel cell 116 and emission abatement device 118. The diverter valve 136 is electrically coupled to the electronic control unit 16 via a signal line 138. As such, the position of the diverter valve 136 is under the control of the electronic control unit 16. As a result, the electronic control unit 16, amongst its other functions, may selectively direct the flow of reformate gas from the plasma fuel reformer 12 to either the fuel cell 116 or the emission abatement device 118.

It should be appreciated that in certain system configurations, the flow of reformate gas from the plasma fuel reformer 12 may be split by use of the flow diverter valve 136 with a portion of the reformate gas being supplied to the fuel cell 116 and another portion of the reformate gas being supplied to the emission abatement device 118. In particular, if desired, a portion of the reformate gas produced by the plasma fuel reformer 12 could also be supplied to the fuel cell 116 during operation of the engine 112. Specifically, the fuel cell 116 may be operated to provide electrical power when the engine 112 is running in addition to when the engine 112 is not running.

Figure 5:
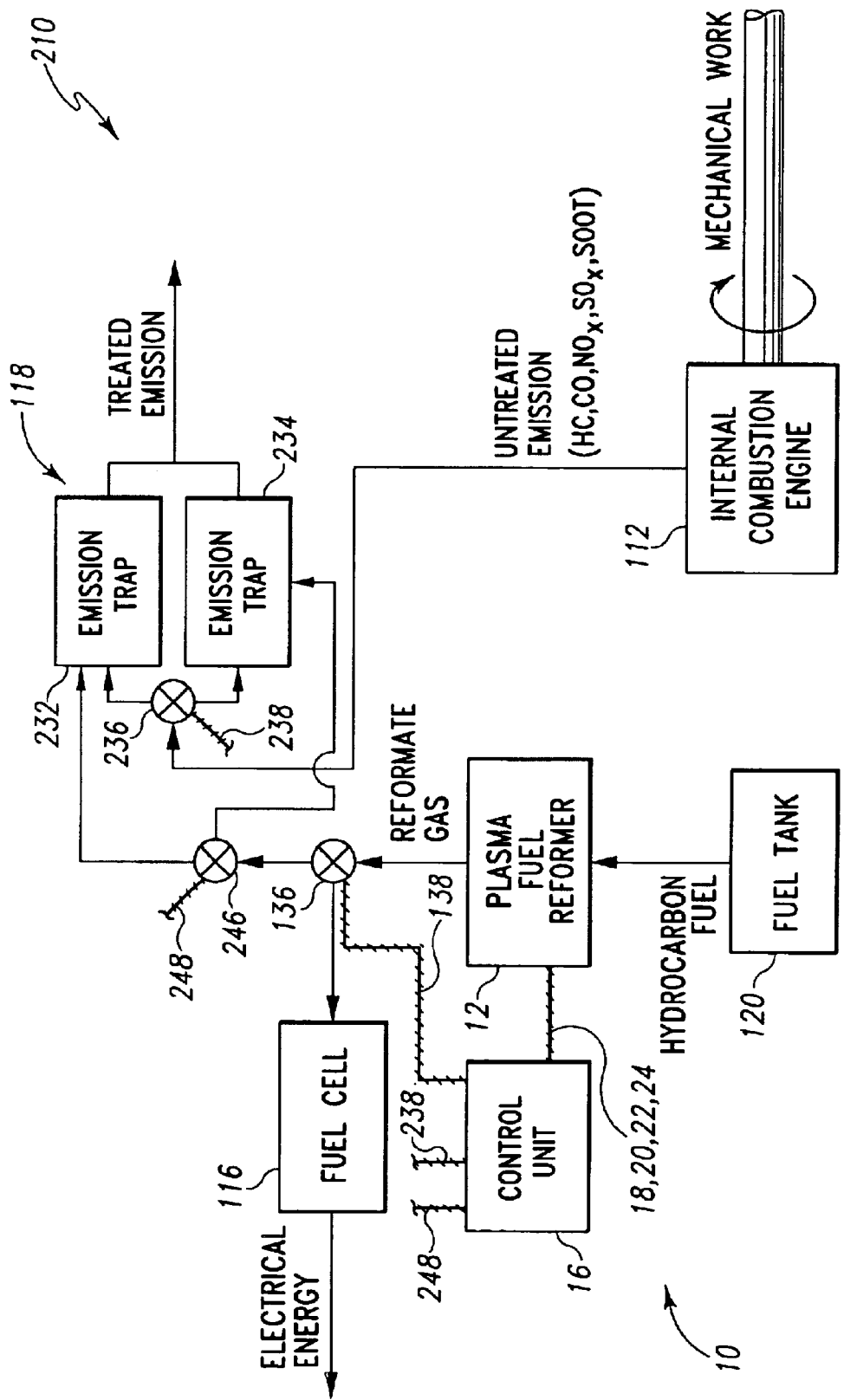
FIG. 5 is a simplified block diagram of another embodiment of a power system.

Referring now to FIG. 5, there is shown another exemplary embodiment of a power system (hereinafter referred to with reference numeral 210). The power system 210 is somewhat similar to the power system 110 of FIGS. 3 and 4. As such, the same reference numerals are used in FIGS. 5 and 6 to designate common components which were previously discussed in regard to FIGS. 3 and 4, with additional discussion thereof being unwarranted.

As shown in FIG. 5, the emission abatement device 118 of the power system 210 is embodied as a pair of traps 232, 234. The traps 232, 234 trap, store, or otherwise remove certain compounds from the engine's exhaust gases such as $NO_X$ and $SO_X$. Once trapped, the compounds are then exposed to a catalytic regeneration reaction which breaks the compounds down into less harmful compounds prior to being exhausted.

A diverter valve 236 selectively diverts the flow of exhausts gases from the engine 112 between the traps 232, 234. For example, exhaust gases from the engine 112 may be routed through the trap 232 while the trap 234 is maintained "offline." While offline, the trap 234 may undergo regeneration. Once the trap 234 has been regenerated, the position of the diverter valve 236 may be switched such that exhaust gases from the engine 112 are routed through the trap 234 while the trap 232 is offline for regeneration.

It should be appreciated that the exhaust gas diverter valve 236 may be embodied as either a two position valve, or, in some configurations, a variable flow valve. In the case of use of a two position valve, the flow of exhaust gases is completely interrupted to the offline trap 232, 234. In other words, the offline trap 232, 234 is isolated from the flow of exhaust gases. However, in the case of use of a variable flow valve, a desired amount of the exhaust gas flow may be directed through the offline trap 232, 234. This reduced flow may be utilized to facilitate the regeneration process of the trap 232, 234 depending on the type and design of the trap 232, 234. For example, during regeneration of a $NO_X$ trap, it may be desirable to have little to no flow of exhaust gases through the trap. However, in the case of regeneration of a soot particulate filter such as the filter described in the aforementioned and incorporated U.S. Provisional Patent Application, it may be desirable to have some degree of a flow of exhaust gases through filter during regeneration thereof. For example, it may be desirable to put a controlled flow of exhaust gas through the filter to supply sufficient amounts of oxygen to sustain the oxidation reactions at the face of the upstream catalyst (i.e., the catalyst which creates the heat to burn the soot in the downstream filter) and to provide sufficient amounts of oxygen to burn the soot in the soot filter with the heat generated by the catalyst.

To operate in such a manner, the diverter valve 236 is electrically coupled to the electronic control unit 16 via a signal line 238. As such, the position of the diverter valve 236 is under the control of the electronic control unit 16. Hence, the electronic control unit 16, amongst its other functions, selectively directs the flow of exhaust gas from the engine 112 to either the trap 232 or the trap 234, or a combination of both traps 232, 234 in the case of a variable flow diverter valve 236.

The control scheme for controlling the position of the diverter valve 236 may be designed in a number of different manners. For example, a timing-based control scheme may be utilized in which the position of the diverter valve 236 is changed as a function of time. For instance, regeneration of the traps 232, 234 may be performed at predetermined timed intervals.

Alternatively, a sensor-based control scheme may be utilized. In such a case, the position of the diverter valve 236 is changed as a function of output from one or more sensors associated with the traps 232, 234. For instance, regeneration of one of the traps 232, 234 may commence when the output from $NO_X$ sensor(s) (not shown) associated with the particular trap 232, 234 is indicative of a predetermined saturation level.

A flow diverter valve 246 is used to direct reformate gas from the plasma fuel reformer 12 to the appropriate trap 232, 234. In particular, the diverter valve 246 selectively diverts the flow of reformate gas between the traps 232, 234. For example, reformate gas from the plasma fuel reformer 12 is routed through the diverter valve 246 to the trap 232 when the trap 232 is offline and undergoing a regeneration cycle. When it is time to regenerate the trap 234, the position of the diverter valve 246 may be switched such that reformats gas from the plasma fuel reformer 12 is routed through the diverter valve 246 to the trap 234 when the trap 234 is offline for regeneration.

To operate in such a manner, the diverter valve 246 is electrically coupled to the electronic control unit 16 via a signal line 248. As such, the position of the diverter valve 246 is under the control of the electronic control unit 16. Hence, the electronic control unit 16, amongst its other functions, selectively directs the flow of reformate gas from the plasma fuel reformer 12 to either the trap 232 or the trap 234.

The control scheme executed by the control unit 16 controls the position of the various diverter valves in order to selectively direct reformate gas and exhaust gases to the appropriate trap 232, 234. In particular, the control unit 16 coordinates the position of the reformate gas diverter valves 136 and 246 with the exhaust diverter valve 236 to direct the flow of reformate gas and exhaust gas to the appropriate trap 232, 234. In particular, when the exhaust diverter valve 236 is positioned so as to direct exhaust gas through the trap 232 (i.e., the trap 234 is offline), the reformate gas diverter valves 136, 246 are respectively positioned so as to direct the flow of reformate gas from the plasma fuel reformer 12 to the trap 234 thereby facilitating regeneration thereof. Conversely, when the exhaust diverter valve 236 is positioned so as to direct exhaust gas through the trap 234 (i.e., the trap 232 is offline), the reformate gas diverter valves 136, 246 are respectively positioned so as to direct the flow of reformate gas from the plasma fuel reformer 12 to the trap 232 thereby facilitating regeneration thereof.

It should be appreciated that the emission abatement device 118 may be configured to include one or more additional catalysts to function in conjunction with the traps 232, 234. For example, an oxidation catalyst (not shown) may be positioned downstream from the traps 232, 234 to oxidize any $H_2S$ that may be present in the gases being exhausted from the traps 232, 234.

The emission abatement device 118 of the power system 210 may also be configured to include one or more soot particulate filters such as the soot particulate filters described above. In such a case, the soot particulate filters may be arranged in a similar parallel configuration as the traps 232, 234, with one soot particulate filter being operated to trap soot from the flow of exhaust gases while the other soot particulate filter is offline for regeneration. Alternatively, if desired, the soot particulate filter may be housed in the same structure as the traps 232, 234. Use of a soot particulate filter is particularly useful in the case of when the internal combustion engine 112 is embodied as a diesel engine.

Figure 6:
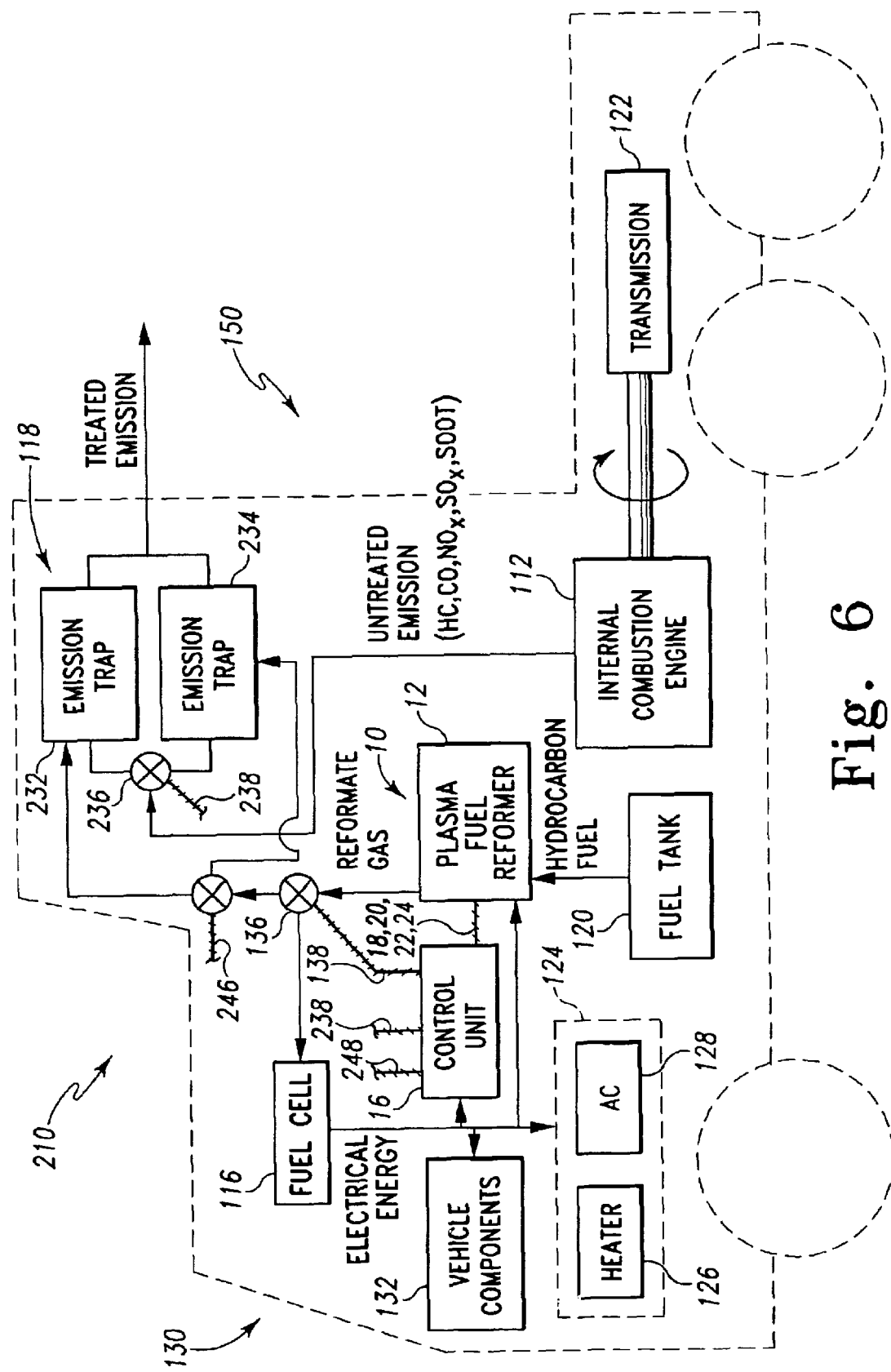
FIG. 6 is a simplified block diagram of the power system of FIG. 5 as used in the construction of a vehicle.

Referring now to FIG. 6, there is shown a specific exemplary implementation of the power system 210. Specifically, in a similar manner to as described herein in regard to FIG. 4, the power system 210 may be used in the design of a vehicle such as the on-highway truck 150. In such a case, the plasma fuel reformer 12 may be operated to provide reformate gas to the truck's fuel cell 116 and the traps 232, 234 of the emission abatement device 118.

Similarly to as described herein in regard to FIG. 4, the fuel cell 116 of the power system 210 may be operated to provide electrical power to a number of components associated with the truck 150. For example, the fuel cell 116 may be operated to provide electrical power to the electrically-powered heater 126 and/or air conditioning unit 128 of the truck's heating and cooling system 124 thereby providing heated and cooled air to the cab 30 of the truck 150. Moreover, other vehicle components 132 such as the truck's exterior and interior lighting, accessories (e.g., radio), electronic control systems (e.g., engine control module, brake control module, etcetera), engine devices (e.g., fuel pump, fuel injector system, etcetera), or the like may be powered by electrical energy generated by the fuel cell 116 of the power system 210. Electrical power from the fuel cell 116 may also be used to operate the plasma fuel reformer 12. Specifically, as described herein, the plasma fuel reformer 12 requires electrical power to generate a plasma field. Such electrical power may be provided by the fuel cell 116.

It should be appreciated that a power generation scheme may be implemented to leverage mechanical output from the engine during operation thereof. For example, electrical power may be supplied to the truck's electrical components (e.g., the heating and cooling system 124, the plasma fuel reformer 12, etcetera) by use of a conventional power generating system (e.g., an alternator) during operation of the engine 112 with electrical energy from the fuel cell 116 being utilized to power the truck's electrical components during inoperation of the engine (i.e., when the engine 112 is not running).

The configurations of the power systems described herein may be varied to fit the needs of a given application. For example, the plasma fuel reformer 12 need not only be used in conjunction with the emission abatement device 118 of FIGS. 5 and 6 (i.e., a device which includes the traps 232, 234), but rather may be used in conjunction with any type of emission abatement device. In a similar manner, the emission abatement device 118 of FIGS. 5 and 6 need not only be used in conjunction with the plasma fuel reformer 12, but rather may be used in conjunction with any type of fuel reformer.

Moreover, the power systems described herein have numerous other applications. For example, the power systems described herein may be used in the design of a hybrid vehicle. In such a case, the mechanical output from the internal combustion engine 112 may be mechanically coupled to a power generator which converts rotary mechanical power into electrical power which is stored in the hybrid vehicle's batteries for use by the vehicle's electric motor.

The power systems described herein also have numerous applications other than vehicular power systems. For example, the power systems described herein may be used in the design of a stationary power generating system. In such a case, the mechanical output from the internal combustion engine 112 may be mechanically coupled to a power generator which converts rotary mechanical power into electrical power. Moreover, the mechanical output of the internal combustion engine 112 may be used to drive a pump mechanism or the like associated with a pump assembly.

The configuration of the power systems described herein may also be modified to provide reformate gas to other components associated with the system in addition to the fuel cell and the emission abatement device. For example, reformate gas from the plasma fuel reformer may be supplied to the intake of the internal combustion engine. Indeed, as either the sole fuel source, or as a fuel additive, the combustion of reformate gas significantly reduces emissions during operation of the engine. This is particularly useful in the case of when the internal combustion engine 112 is embodied as a spark-ignited engine which combusts a hydrocarbon fuel such as gasoline, natural gas, methanol, or propane. In such a configuration (i.e., reformats gas is being supplied to the intake of the engine prior to combustion), it may be possible to eliminate one or more emission abatement mechanisms from the power system as a result of the reduction in emissions produced by the engine.

To provide reformate gas to the internal combustion engine, the engine may be configured to include a carburetor for advancing the reformate gas into the engine's combustion chambers, a fuel injection assembly for injecting the reformate gas into the engine's combustion chambers, or any other similar device depending on the particular design of the engine. Alternatively, the engine's existing fuel delivery system may be modified to simultaneously inject or otherwise advance hydrocarbon fuel and reformate gas into the engine's combustion chambers. The fuel reformer may be configured to fluidly communicate reformate gas to any such a mechanism associated with the engine.

Referring now to FIGS. 8 and 9, there is shown a combination emission abatement assembly 400. The emission abatement assembly 400 may be used as the emission abatement device 118 of the herein described power systems 110, 210. However, the emission abatement assembly may also be utilized in the construction of many other systems including systems which may or may not include a fuel cell. The combination emission abatement assembly 400 has a number of different devices for treating a number of different exhaust effluents from the exhaust gas of an internal combustion engine. For example, as will now be described in greater detail, the plasma fuel reformer 12 may be operated to generate and supply a reformate gas to an emission abatement assembly having both a $NO_X$ trap 402 and a soot particulate filter 404. In such a case, the reformate gas from the plasma fuel reformer 12 is used to selectively regenerate both the $NO_X$ trap 402 and the soot particulate filter 404.

As shown in FIG. 9, the soot $NO_X$ trap 402 and the soot particulate filter 404 may be housed in separate housings coupled to one another by use of, for example, sections of exhaust pipe. Alternatively, the $NO_X$ trap 402 and the soot particulate filter 404 may be fabricated in a common housing.

It should be appreciated that the components (i.e., the $NO_X$ trap 402 and the soot particulate filter 404) may be positioned in any order or arrangement to fit the needs of a give system. In particular, based on a number of system design considerations, it may be desirable to position one device upstream of the other, whereas in other system designs the opposite positioning may be more desirable. In the exemplary embodiment described herein, the soot particulate filter 404 of the emission abatement assembly 400 is positioned downstream from the $NO_X$ trap 402. As will be described herein, such an arrangement facilitates control of both the $NO_X$ trap regeneration process and the soot particulate filter regeneration process.

As with the $NO_X$ traps described above in regard to FIGS. 3-6, the $NO_X$ trap 402 of the combination emission abatement assembly 400 may be any type of commercially available $NO_X$ trap. In the case of when the emission abatement assembly 400 is used to treat exhaust gases from a diesel engine, the $NO_X$ trap 402 is embodied as a lean $NO_X$ trap so as to facilitate the trapping and removal of $NO_X$ in the lean conditions associated with diesel exhaust gases. Specific examples of $NO_X$ traps which may be used in the construction of the combination emission abatement assembly include, but are not limited to, the aforementioned $NO_X$ traps commercially available from, or $NO_X$ traps constructed with materials commercially available from, EmeraChem.

The soot particulate filter used in the construction of the combination emission abatement assembly 400 may be any type of commercially available particulate filter. For example, similar to as described above in regard to the soot filters of FIGS. 3–6, the soot particulate filter 404 may be embodied as any known exhaust particulate filter such as a "deep bed" or "wall flow" filter. Deep bed filters may be embodied as metallic mesh filters, metallic or ceramic foam filters, ceramic fiber mesh filters, and the like. Wall flow filters, on the other hand, may be embodied as a cordierite or silicon carbide ceramic filter with alternating channels plugged at the front and rear of the filter thereby forcing the gas advancing therethrough into one channel, through the walls, and out another channel. Moreover, the soot particulate filter 404 may also be impregnated with a catalytic material such as, for example, a precious metal catalytic material. In the exemplary embodiment described herein and shown in FIGS. 8 and 9, the soot particulate filter 404 of the combination emission abatement assembly 400 is embodied as one of the devices described in the aforementioned and incorporated U.S. Provisional Patent Application Ser. No. 60/375,134.

Referring now to FIG. 9, the combination emission abatement assembly 400 is shown in greater detail. The $NO_X$ absorber catalyst 406 of the $NO_X$ trap 402 is housed in an interior chamber 408 of a housing 410. The housing 410 has an upstream end 412 coupled to an exhaust pipe 414, and a downstream end 416 coupled to an exhaust pipe 418. The upstream end 412 of the housing 410 defines an exhaust gas inlet 420, whereas the downstream end 416 of the housing 410 defines an exhaust gas outlet 422. Hence, exhaust gases from the diesel engine enter the housing 410 through the exhaust gas inlet 420, are advanced through the $NO_X$ absorber catalyst 406, and then are exhausted from the housing 410 via the exhaust gas outlet 422.

The $NO_X$ trap 402 has an inlet 424 for receiving reformate gas from the plasma fuel reformer 12. The inlet 424 may be configured as an orifice that is defined in the walls of the housing 410, or, alternatively, may include a tube, coupling assembly, or other structure which extends through the wall of the housing 410. In addition, if the reformate gas is introduced upstream of the upstream end 412 of the housing 410, the exhaust gas inlet 420 of the housing 410 functions as the reformate gas inlet of the $NO_X$ trap 402.

The plasma fuel reformer 12 is fluidly coupled to the reformate gas inlet associated with the $NO_X$ trap 402. In particular, a first end of a fluid line 426 is coupled to the outlet of the plasma fuel reformer 12 (via a flow diverter valve 466, as described below), whereas a second end of the fluid line 426 extends through, or is coupled to, the gas inlet 424 such that reformate gas may be advanced into the chamber 408 of the housing 410. In such a manner, reformate gas from the plasma fuel reformer 12 may be advanced into contact with the $NO_X$ absorber catalyst 406.

As shown in FIGS. 8 and 9, the electronic control unit 16 is also electrically coupled to a pair of $NO_X$ sensors 428, 430 via a pair of signal lines 432, 434, respectively. The $NO_X$ sensors 428, 430 are utilized to sense the difference in $NO_X$ concentration across the $NO_X$ absorber catalyst 406 in order to determine when the $NO_X$ trap 402 requires regeneration. In particular, the $NO_X$ sensors 428, 430 cooperate to determine the amount of $NO_X$ being removed from the exhaust gases (i.e., trapped) by the $NO_X$ absorber catalyst 406. When the amount of $NO_X$ being trapped by the $NO_X$ absorber catalyst 406 diminishes to a predetermined level, the electronic control unit 16 commences the regeneration process. It should be appreciated that while shown in FIGS. 8 and 9 as utilizing two $NO_X$ sensors, a single $NO_X$ sensor on the downstream side of $NO_X$ absorber catalyst 406 may be utilized, if desired. In such a configuration, the electronic control unit 16 would monitor when the $NO_X$ concentration sensed by the single $NO_X$ sensor exceeded a predetermined upper threshold, as opposed to monitoring the $NO_X$ removal efficiency across the $NO_X$ absorber catalyst 406.

Alternatively, other control schemes may also be utilized to commence a regeneration cycle. For example, a timing-based control scheme may be utilized in which the $NO_X$ trap 402 is regenerated as a function of time. In such a case, regeneration of the $NO_X$ trap 402 is performed at predetermined timed intervals.

Referring back to FIG. 9, the soot particulate filter 404 is also shown in greater detail. A catalyst 436 and a filter 438 of the soot particulate filter 404 are housed in an interior chamber 440 of a housing 442. The housing 442 has an upstream end 444 coupled to the exhaust pipe 418 extending from the downstream end 416 of the $NO_X$ trap housing 410. The housing 442 also has a downstream end 446 coupled to an exhaust pipe 448 that is either open to the atmosphere or coupled to an additional exhaust system component (not shown) positioned downstream of the combination emission abatement assembly 400. The upstream end 444 of the housing 442 defines an exhaust gas inlet 450, whereas the downstream end 446 of the housing 442 defines an exhaust gas outlet 452. Hence, exhaust gases from the engine enter the housing 442 through the exhaust gas inlet 450, are advanced through the catalyst 436 and the soot filter 438, and then are exhausted from the housing 442 via the exhaust gas outlet 452.

The soot particulate filter 404 has an inlet 454 for receiving reformate gas from the plasma fuel reformer 12. Similar to the inlet of the $NO_X$ trap 402, the inlet of the soot particulate filter 404 may be configured as an orifice that is defined in the walls of the housing 442, or, alternatively, may include a tube, coupling assembly, or other structure which extends through the wall of the housing 442. In addition, if the reformate gas is introduced upstream of the upstream end 444 of the housing 442, the exhaust gas inlet 450 of the housing 442 functions as the reformate gas inlet of the soot particulate filter 404.

The plasma fuel reformer 12 is fluidly coupled to the reformate gas inlet associated with the soot particulate filter 404. In particular, a first end of a fluid line 456 is coupled to the outlet of the plasma fuel reformer 12 (via the flow diverter valve 466, as described below), whereas a second end of the fluid line 456 extends through, or is coupled to, the gas inlet 454 such that reformate gas may be advanced into the chamber 440 of the housing 442. In such a manner, the reformate gas from the plasma fuel reformer 12 may be introduced into a flow of exhaust gas from the engine and into contact with the catalyst 436. In particular, as described above in regard to FIG. 7, during a regeneration cycle, reformate gas from the plasma fuel reformer 12 is advanced into contact with the catalyst 436 to catalyze an oxidation reaction between the oxygen in the exhaust gas of the engine and the reformate gas. Specifically, when the reformate gas is advanced into contact with the catalyst 436 in the presence of exhaust gas (or other source of oxygen), the catalyst 436 catalyzes an oxidation reaction which converts the hydrogen gas present in the reformate gas and the oxygen present in the exhaust gases into, amongst other things, water. Moreover, the catalyst 436 catalyzes an oxidation reaction which converts the carbon monoxide present in the reformate gas and the oxygen present in the exhaust gases into carbon dioxide. Both of these oxidation reactions are highly exothermic, and, as a result, produce heat that is transferred to the downstream-positioned soot filter 438. The heat, which may illustratively be in the range of 600–650 degrees Celsius, ignites and burns soot particles trapped in the soot filter 438 thereby regenerating the soot particulate filter 404.

As shown in FIGS. 8 and 9, the electronic control unit 16 is also electrically coupled to a pair of pressure sensors 458, 460 via a pair of signal lines 462, 464, respectively. The pressure sensors 458, 460 may be utilized to sense the pressure difference across the soot particulate filter 404 in order to determine when the soot filter 438 requires regeneration. Specifically, when the pressure drop across the soot particulate filter 404 increases to a predetermined value, the electronic control unit 16 commences the filter regeneration process. It should be appreciated that while shown in FIGS. 8 and 9 as utilizing two pressure sensors, a single pressure sensor on either side of soot particulate filter 404 may be utilized, if desired. In such a configuration, the electronic control unit 16 would monitor when the pressure sensed by the single pressure sensor exceeded a predetermined upper threshold or was below a predetermined lower threshold, as opposed to monitoring the pressure drop across the soot particulate filter 404.

As alluded to above, an electronically-controlled flow diverter valve 466 is utilized to selectively direct the flow of reformate gas from the plasma fuel reformer 12 between the $NO_X$ trap 402 and the soot particulate filter 404. In particular, one end of a fluid line 480 is coupled to the outlet 76 of the plasma fuel reformer, whereas the other end of the fluid line 480 is coupled to the inlet of the diverter valve 466. A first outlet of the diverter valve 466 is fluidly coupled to the inlet 424 of the $NO_X$ trap 402 via the fluid line 426, whereas a second outlet of the diverter valve 466 is fluidly coupled to the inlet 454 of soot particulate filter 404 via the fluid line 456.

The diverter valve 466 is electrically coupled to the electronic control unit 16 via a signal line 468. As such, the position of the diverter valve 466 is under the control of the electronic control unit 16. As a result, the electronic control unit 16, amongst its other functions, selectively directs the flow of reformate gas from the plasma fuel reformer 12 to either the $NO_X$ trap 402 or the soot particulate filter 404. Hence, during operation of the engine, the electronic control unit 16 executes a control routine that, amongst other things, determines when to regenerate the respective components of the combination emission abatement assembly 400. In particular, based on the type of control scheme being utilized (e.g., a sensor-based control scheme or a time-based control scheme), the electronic control unit 16 determines when to regenerate the $NO_X$ trap 402 and the soot particulate filter 404 and thereafter positions the diverter valve 466 in a desired position so as to direct the flow of reformate gas from the plasma fuel reformer 12 to the appropriate device (i.e., to either the $NO_X$ trap 402 or the soot particulate filter 404). It should be appreciated that in certain system configurations, the flow of reformate gas from the plasma fuel reformer 12 may be split by use of the flow diverter valve 466 with a portion of the reformate gas being supplied to the $NO_X$ trap 402 and another portion of the reformate gas being supplied to the soot particulate filter 404.

Figure 10:
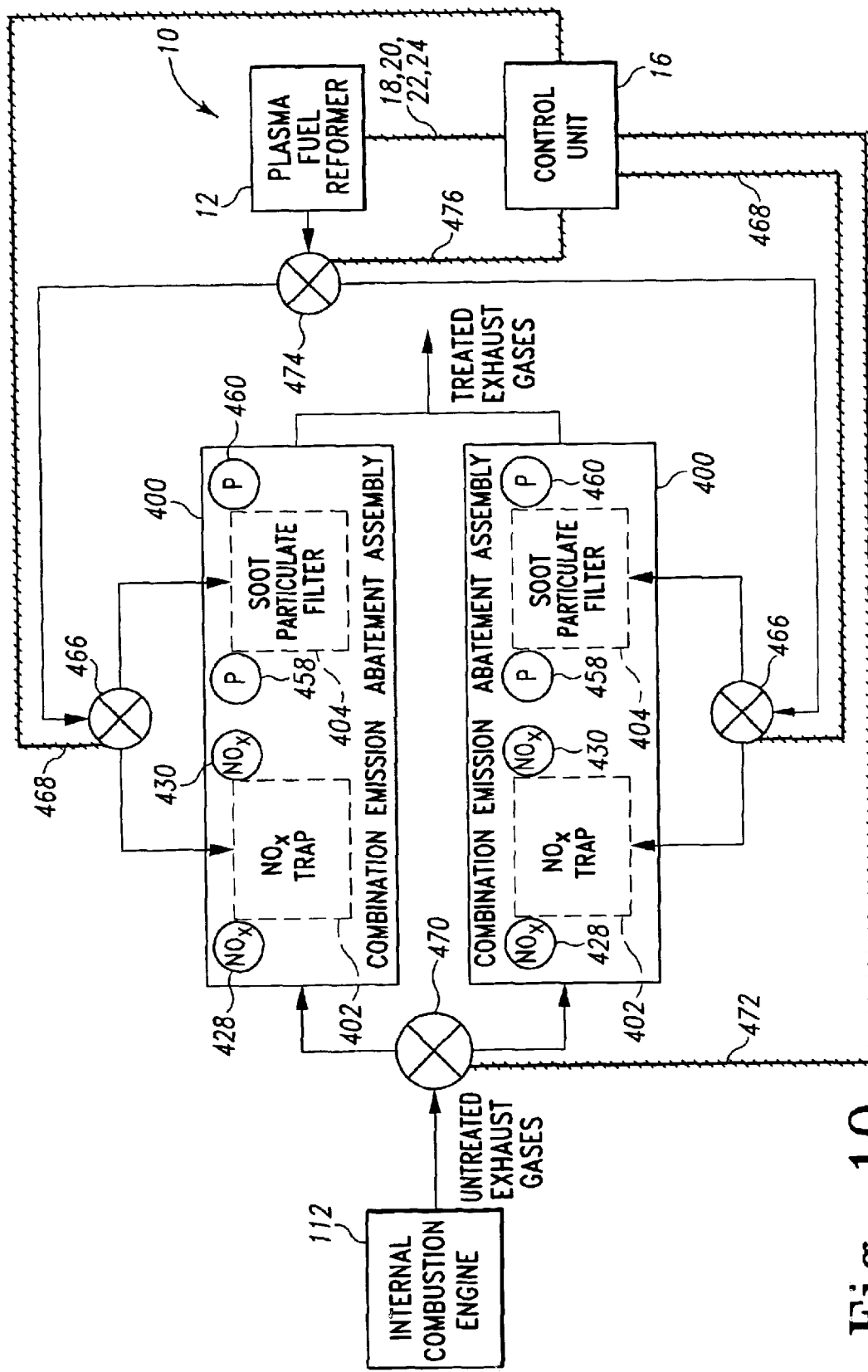
FIG. 10 is a simplified block diagram of a system having a pair of the combination emission abatement assemblies of FIG. 9 positioned in a parallel arrangement.

Referring now to FIG. 10, there is shown an exhaust gas treatment system which utilizes a pair of the emission abatement assemblies 400 positioned in a parallel arrangement similar in nature to the traps 232, 234 of FIGS. 5 and 6. The same reference numerals are used in FIG. 10 to designate common components which were previously discussed in regard to FIGS. 8 and 9 with additional discussion thereof being unwarranted. Moreover, a number of components from FIGS. 8 and 9 (e.g., the signal lines associated with the sensors) have been removed for clarity of description.

As shown in FIG. 10, an exhaust gas diverter valve 470 selectively diverts the flow of exhausts gases between the two combination emission abatement assemblies 400. For example, exhaust gases from the engine 112 may be routed through one of the assemblies 400 while the other assembly 400 is maintained offline. While offline, one or both of the $NO_X$ trap 402 and the soot particulate filter 404 of the assembly 400 may undergo regeneration. Once the $NO_X$ trap 402 and/or the soot particulate filter 404 have been regenerated, the position of the diverter valve 470 may be switched such that exhaust gases from the engine are routed through the recently regenerated emission abatement assembly 400 while the other assembly 400 is offline for regeneration.

It should be appreciated that the exhaust gas diverter valve 470 may be embodied as either a two position valve, or, in some configurations, a variable flow valve. In the case of use of a two position valve, the flow of exhaust gases is completely interrupted to the offline combination emission abatement system 400. In other words, the offline combination emission abatement assembly 400 is isolated from the flow of exhaust gases. However, in the case of use of a variable flow valve, a desired amount of the exhaust gas flow may be directed through the offline combination emission abatement assembly 400. This reduced flow may be utilized to facilitate the regeneration process of one or both of the $NO_X$ trap 402 and the soot particulate filter 404. For example, during regeneration of the $NO_X$ trap 402, it may be desirable to have little to no flow of exhaust gases through the trap. However, in the case of regeneration of the soot particulate filter 404, it may be desirable to have some degree of a flow of exhaust gases through filter 404. For example, it may be desirable to advance a controlled flow of exhaust gas through the filter 404 to supply sufficient amounts of oxygen to sustain the oxidation reactions at the face of the upstream catalyst 436 and to provide sufficient amounts of oxygen to burn the soot in the soot filter 438 with the heat generated by the catalyst 436.

To operate in such a manner, the diverter valve 470 is electrically coupled to the electronic control unit 16 via a signal line 472. As such, the position of the diverter valve 470 is under the control of the electronic control unit 16. Hence, the electronic control unit 16, amongst its other functions, selectively directs the flow of exhaust gas from the engine, or a portion of the flow of exhaust gas from the engine, to the appropriate combination emission abatement assemblies 400.

The control scheme for controlling the position of the diverter valve 470 may be designed in a number of different manners. For example, a timing-based control scheme may be utilized in which the position of the diverter valve 470 is changed as a function of time. For instance, regeneration of the individual devices of the combination emission abatement assemblies 400 may be performed at predetermined timed intervals.

Alternatively, as described above, a sensor-based control scheme may be utilized to detect when a particular $NO_X$ trap 402 or a particular soot particulate filter 404 of the assemblies 400 is in need of regeneration. In such a case, the position of the diverter valve 470 is changed as a function of the output from one or more sensors associated with the assemblies 400. For instance, regeneration of one of the $NO_X$ traps 402 may commence when the output from the $NO_X$ sensors 428, 430 associated with the particular trap 402 is indicative of a predetermined saturation level. Similarly, regeneration of one of the soot particulate filters 404 may commence when output from the pressure sensors 458, 460 associated with the particular soot particulate filter 404 is indicative of a predetermined saturation level.

A flow diverter valve 474 is used to direct reformate gas from the plasma fuel reformer 12 to the appropriate emission abatement assembly 400. In other words, the diverter valve 474 selectively diverts the flow of reformate gas between the two emission abatement assemblies 400. For example, reformate gas from the plasma fuel reformer 12 is routed through the diverter valve 474 and to a particular emission abatement assembly 400 when the assembly is offline and undergoing a regeneration cycle.

To operate in such a manner, the diverter valve 474 is electrically coupled to the electronic control unit 16 via a signal line 476. As such, the position of the diverter valve 474 is under the control of the electronic control unit 16. Hence, the electronic control unit 16, amongst its other functions, selectively directs the flow of reformate gas from the plasma fuel reformer 12 to either one of the emission abatement assemblies 400. From there, the flow of reformate gas is further routed by the diverter valve 466 so as to direct the flow of reformats gas from the plasma fuel reformer 12 to the appropriate device (i.e., to either the $NO_X$ trap 402 or the soot particulate filter 404) associated with the particular emission abatement assembly 400.

The control scheme executed by the control unit 16 controls the position of the various diverter valves in order to selectively direct reformate gas and exhaust gas to the appropriate device of the combination emission abatement assemblies 400. In particular, the control unit 16 coordinates the position of the reformate gas diverter valves 466 and 474 with the position of the exhaust diverter valve 470 to direct the flow of reformate gas and the flow of exhaust gas to the appropriate device (i.e., either the $NO_X$ trap 402 or the soot particulate filter 404) of the appropriate combination emission abatement assembly 400. In particular, when the exhaust diverter valve 470 is positioned so as to direct exhaust gas through a particular one of the emission abatement assemblies 400 (i.e., the online assembly 400), the reformate gas diverter valves 466 and 474 are respectively positioned so as to direct the flow of reformate gas from the plasma fuel reformer 12 to the appropriate device of the offline assembly 400 thereby facilitating regeneration thereof. As described above, in such a case, the exhaust diverter valve 470 may be selectively positioned to allow a controlled flow of exhaust gases through the offline assembly 400 if such a controlled flow is useful during the regeneration process.

Figure 11:
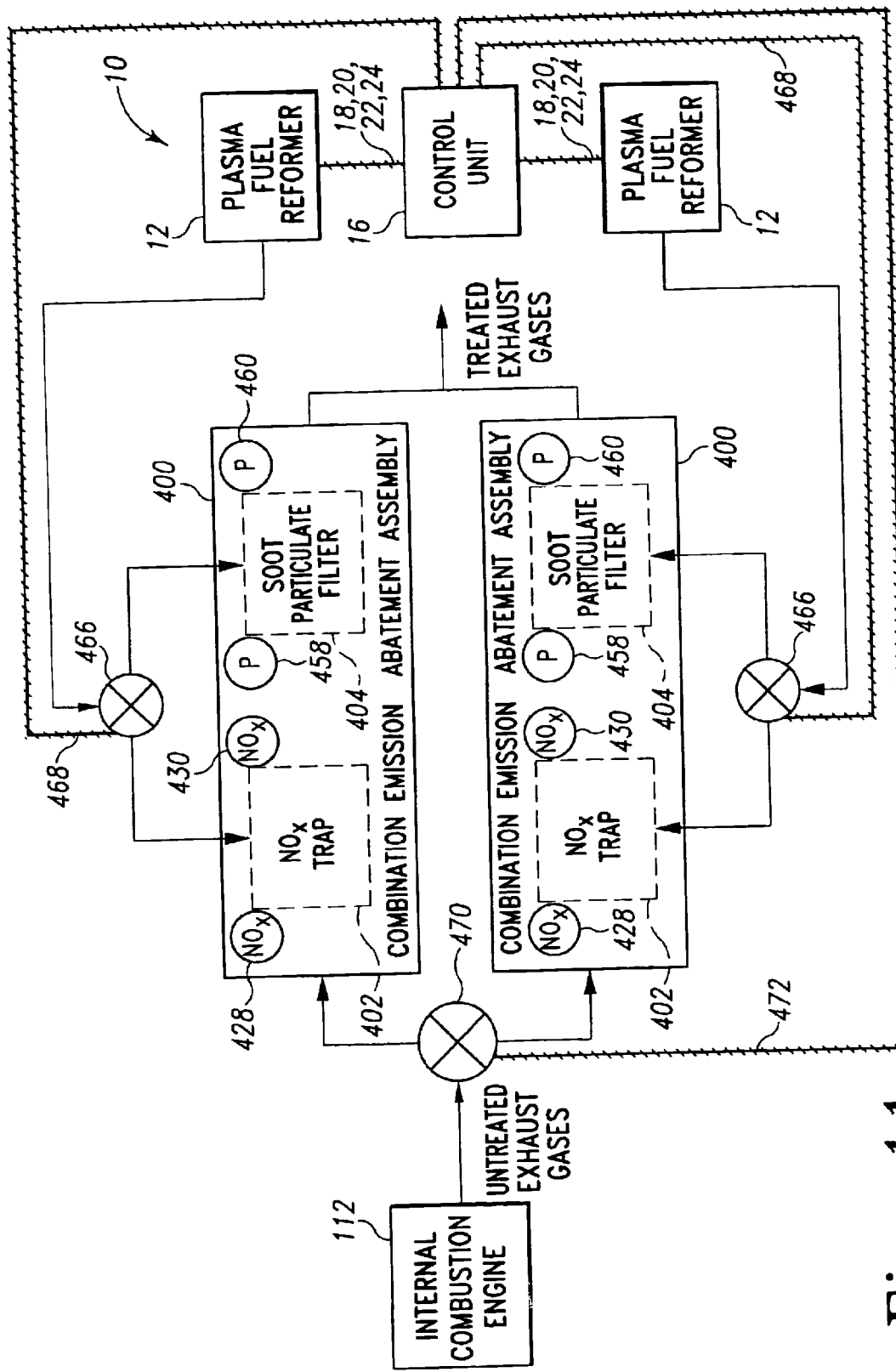
FIG. 11 is view similar to FIG. 10, but showing a system which has a pair of plasma fuel reformers.

Referring now to FIG. 11, there is shown an exhaust gas treatment system which is similar to the system shown in FIG. 10. The same reference numerals are used in FIG. 11 to designate common components which were previously discussed in regard to FIG. 10 with additional discussion thereof being unwarranted.

The system of FIG. 11 is essentially the same as the system of FIG. 10 with the exception that a pair of plasma fuel reformers 12 are utilized. The use of multiple fuel reformers is particularly useful in the case of when the reformate gas requirements of the system exceed the production capacity of a single reformer.

In the exemplary embodiment shown in FIG. 11, each of the plasma fuel reformers 12 is "dedicated" to one of the assemblies 400. In other words, reformate gas from a particular plasma fuel reformer 12 is used to regenerate one of the $NO_X$ traps 402 and one of the soot particulate filters 404, but is not used in the regeneration of the other trap 402 or filter 404. However, it should be appreciated that to fit the needs of a given system design, the plasma fuel reformers 12 may be operated to generate and supply reformate gas to any of the devices associated with either of the emission abatement assemblies 400. In such a case, a gas routing/valving scheme and an associated control scheme may be designed to allow for such delivery of reformate gas to any of the devices of either of the combination emission abatement assemblies 400.

As will now be described in greater detail, the plasma fuel reformer 12 may be operated in different modes of operation to generate and supply different quantities and/or compositions of reformate gas to different devices. In particular, as herein described, a single plasma fuel reformer 12 may be operated to generate and supply reformate gas to a number of different devices such a fuel cell, a $NO_X$ trap, a soot particulate filter, an intake of an internal combustion engine, etcetera. Although each of these devices may be supplied a common quantity and/or composition of reformate gas, in certain system designs, it may be desirable to supply one or more such devices with a quantity and/or composition of reformate gas that is different than the quantity and/or composition of reformate gas being supplied to one or more other devices.

The quantity of reformate gas produced by the plasma fuel reformer 12 during a given period of time may be controlled in a number of different manners. For example, the plasma fuel reformer 12 may be selectively operated during the given time period to control the amount of reformate gas produced by the reformer. Specifically, one particularly useful feature of the plasma fuel reformer 12 is its relatively rapid response to requests for changes in the production of reformate gas. Indeed, the amount of reformate gas produced by the plasma fuel reformer 12 may be quickly increased or decreased based on amongst other things, the flow rates of the fuel and air being advanced into the reformer and the power level being supplied to the fuel reformer. Moreover, the plasma fuel reformer 12 may also be deacutated for periods of time by interrupting the power supplied to the electrodes 54, 56 (see FIG. 2) by the power supply 36 (see FIG. 1). Use of such periods of deactuation may be utilized to control the quantity of reformate gas being generated and supplied to a particular device during a given period of time.

The quantity of reformate gas being supplied to a particular device may also be controlled by controlling the flow of reformate gas to the particular device irrespective of the quantity of reformate gas being generated by the plasma fuel reformer 12. In particular, the control scheme for controlling the various reformate gas diverter valves described herein may be designed to direct a flow of reformate gas to a given device for a period of time that is different than the period of time that the valve is positioned to direct the flow of reformate gas to another device. In other words, the valving scheme utilized to direct the flow of reformate gas to particular devices may be designed to supply different quantities of reformate gas to different devices.

Likewise, the composition of the reformate gas produced by the plasma fuel reformer 12 may also be controlled in a number of different manners. For example, reformate gases of different compositions may be produced by varying the air-to-fuel ratio of the air/fuel mixture being processed by the plasma fuel reformer 12. Moreover, the location or locations in which air is introduced into the plasma fuel reformer 12 may also vary the composition of the reformate gas being produced. In particular, as described above, air may be introduced into the plasma fuel reformer 12 at a number of different locations. For example, air is introduced into the plasma fuel reformer 12 through the air inlet 74. Air is also introduced into the plasma fuel reformer 12 by mixing the fuel with air prior to injection with the fuel injector 38. Moreover, the plasma fuel reformer 12 may also be embodied to include additional air inlets. For example, the plasma fuel reformer 12 may be designed to include an air inlet for advancing air directly into the reactor chamber 50 (i.e., without first being advanced through the plasma-generating assembly 42). By varying the proportion of the total air flow introduced through each of these inlets, the composition of the reformate gas may be varied.

Operation of the power supply 36 may also be varied to produce varying reformate gas compositions. For example, by varying the power output level or frequency of the power supply 36, the composition of the reformate gas may be varied.

The composition of the reformate gas may also be varied by varying the presence, number, or type of catalyst through which the reformate gas is advanced subsequent to exiting the plasma-generating assembly 42. For example, as alluded to above, the plasma fuel reformer 12 may be embodied with or without a catalyst positioned in the reaction chamber 50 (i.e., with or without the catalyst 78 of FIG. 2). The reformate gas produced by a plasma fuel reformer having such a catalyst differs in composition from the reformate gas produced by a plasma fuel reformer that does not have such a catalyst. To this end, a plasma fuel reformer may be designed with an internal gas routing/valving scheme that includes a bypass flow path for selectively routing the gas exiting the plasma-generating assembly 42 either through the catalyst 78 positioned in the reaction chamber 50 or, alternatively, around such a catalyst. Alternatively, the catalyst may be removed from the reaction chamber and positioned in a separate housing. In such a case, reformate gas may be selectively routed through such a housing or may bypass such a housing so as to produce reformate gases having different compositions.

It should also be appreciated that additional catalysts may also be utilized to produce reformate gases of varying compositions. In particular, irrespective or whether or not a catalyst is positioned in the reaction chamber 50, a number of additional catalysts may be used to treat the reformate gas. A routing/valving scheme may be designed to selectively route the reformate gas through one or more of such additional catalysts so as to produce reformate gases of varying compositions.

As described above in regard to FIGS. 1 and 2, the plasma fuel reformer 12 may be operated to produce a reformate gas that is rich in, amongst other things, hydrogen and carbon monoxide. The amount of each of these compounds in the reformate gas flow may be varied by use in the above-described manners. Moreover, a flow of reformate gas rich in other compounds may also be created by the above-described manner. For example, reformate gas rich in acetylene, methane, propanol, or ethanol may also be created.

By varying the quantity and/or composition of the reformate gas generated and supplied to a particular device, operation of the device can be balanced with fuel reformer efficiency. In particular, operation of the plasma fuel reformer 12 may be configured to generate and supply a quantity and/or composition of reformate gas that is sufficient to support operation of the device, without being "wasteful." In particular, the efficiency of the system is correlated to both the quantity of reformate gas produced and the "purity" of the gas. For example, the system requires more energy to produce a relatively large quantity of reformate than it does to produce a relatively small amount of reformate gas. Similarly, the system requires more energy to produce a reformate gas that has a relatively large amount of hydrogen than one that has a smaller amount of hydrogen.

From the above description, it should be appreciated that the electronic control unit 16 may be configured to execute a control routine that allows for "customization" of the quantity and/or composition of the reformate gas being generated and supplied to the various devices. For example, in the case of the power systems described in regard to FIGS. 3–6, the plasma fuel reformer 12 may be operated to generate and supply a reformate gas to the fuel cell 116 which has a different composition than the reformate gas that is generated and supplied to the emission abatement device 118. Indeed, certain types of fuel cells operate more efficiently when supplied with a reformate gas that is rich in, for example, hydrogen. While the emission abatement device 118 may be regenerated with reformate gas rich in hydrogen, regeneration may also be sustained with a reformate gas that has not been reformed to such a degree. In particular, regeneration of the emission abatement device 118 may be sustained with a reformate gas rich in hydrocarbons that are larger than hydrogen. For example, regeneration of the emission abatement device may be sustained by use of a reformate gas having sufficient amounts of acetylene, methane, propanol, or ethanol. Hence, the plasma fuel reformer 12 may be operated in one mode of operation in which hydrogen-rich reformate gas is generated and supplied to the fuel cell 116, and also a different mode of operation in which reformate gas rich in larger hydrocarbons is generated and supplied to the emission abatement device 118.

As alluded to above in regard to the discussion relating to FIGS. 3–6, reformate gas from the plasma fuel reformer 12 may also be supplied to the intake of the internal combustion engine 112. In such a case, the quantity and/or composition of the reformate gas supplied to the engine 112 may differ from the quantity and/or composition of the reformate gas supplied to another device (e.g., the fuel cell 116).

A similar scheme may be utilized during regeneration of the combination emission abatement assembly 400 of FIGS. 8–11. In particular, in certain designs, it may be desirable to generate and supply hydrogen-rich reformate gas to one of the devices (e.g., the $NO_X$ trap 402 or the soot particulate filter 404), while generating and supplying reformate gas rich in larger hydrocarbons to the other device. For example, the plasma fuel reformer 12 may be operated in one mode of operation in which hydrogen-rich reformate gas is generated and supplied to the $NO_X$ trap 402, and also a different mode of operation in which reformate gas rich in larger hydrocarbons is generated and supplied to the soot particulate filter 404, or visa versa.

A control scheme that varies the quantity of reformate gas delivered to each device may also be utilized during regeneration of the combination emission abatement assembly 400. In particular, it may be desirable to generate and supply to one of the devices (e.g., the $NO_X$ trap 402 or the soot particulate filter 404) a quantity of reformate gas that is different from the quantity of reformate gas delivered to the other device. For example, the plasma fuel reformer 12 may be operated in one mode of operation in which a first quantity of reformate gas is generated and supplied to the $NO_X$ trap 402, and also a different mode of operation in which a second, smaller quantity of reformate gas rich is generated and supplied to the soot particulate filter 404, or visa versa.

Figure 12:
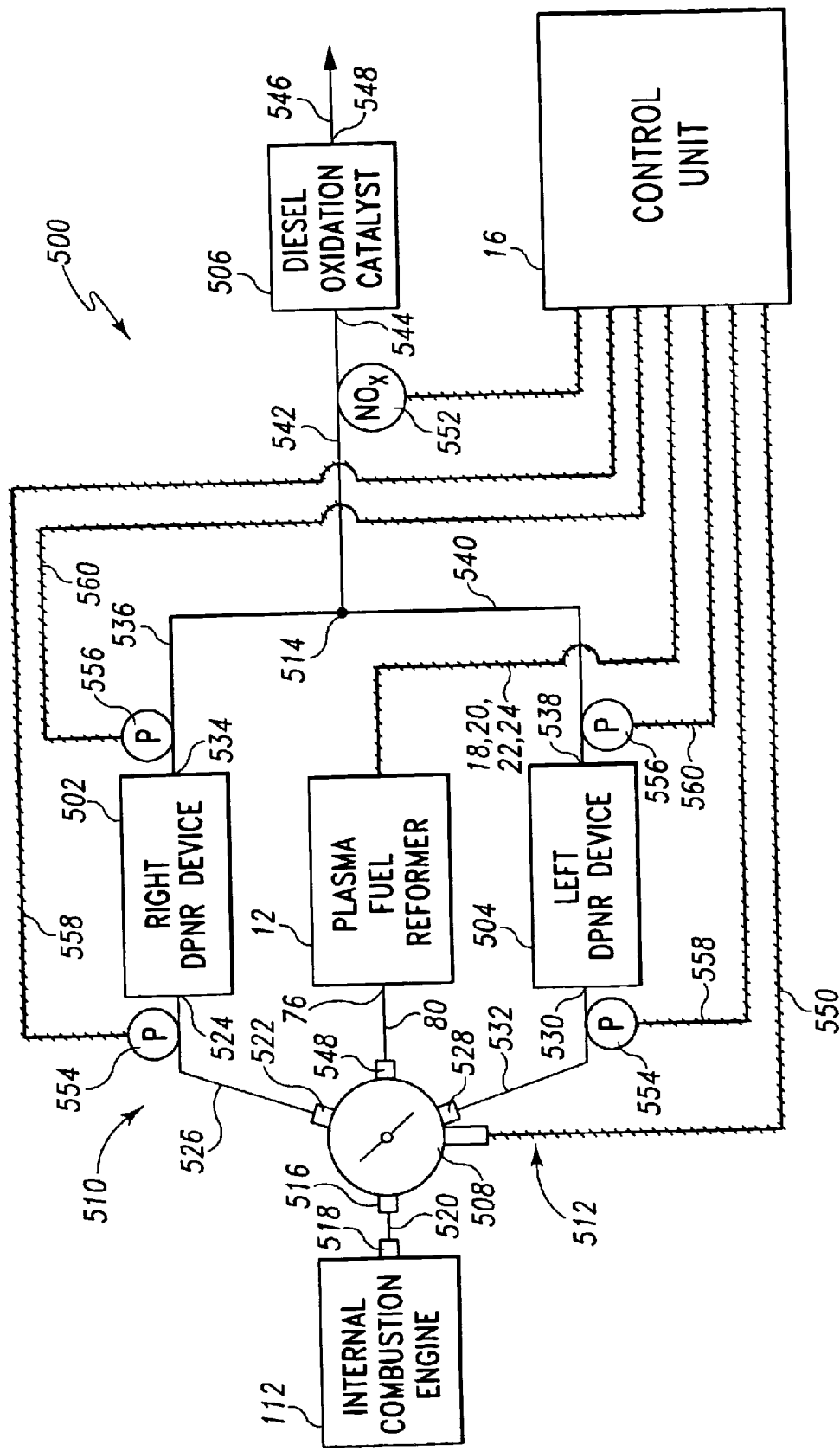
FIG. 12 is a simplified block diagram of an emission abatement assembly.

Referring now to FIG. 12, there is shown another embodiment of an emission abatement assembly (herein referred to with reference numeral 500). The emission abatement assembly 500 includes a pair of diesel particulate-$NO_X$ reduction (DPNR) devices 502, 504 for removing and treating both $NO_X$ and particulate soot present in the exhaust gas from the internal combustion engine 112 (e.g., a diesel engine, a gasoline engine, a gasoline direct injection (GDI) engine, or natural gas engine). The DPNR devices 502, 504 are arranged in a parallel relationship with one another. As such, for purposes of clarity of description, the DPNR device 502 will herein be referred to as the right DPNR device, whereas the DPNR device 504 will herein be referred to as the left DPNR device. However, such use of directional terms (i.e., right and left) is not intended to infer any particular orientation, but rather is only used herein only for ease of description.

The DPNR devices 502, 504 may be any type of DPNR device which facilitates the trapping and removal of $NO_X$ and particulate soot in the lean conditions associated with exhaust gases from diesel engines, GDI engines, or natural gas engines. Specific examples of DPNR devices which may be used as the DPNR devices 502, 504 of the present disclosure include, but are not limited to, the DPNR devices described in U.S. Patent Application Publication Nos. 2002/0165063A1, 2002/0056273A1, and 2003/0010022A1, each of which is hereby incorporated by reference. The DPNR devices of the present disclosure may also be embodied as any of the DPNR devices disclosed in SAE Technical Paper No. 2002-01-0957 entitled "Simultaneous PM and $NO_X$ Reduction System for Diesel Engines" by Nakatani et al., which is also hereby incorporated by reference.

As described in the aforementioned incorporated references, a DPNR device is, in essence, a structure which traps particulate soot and is coated with a $NO_X$ storage reduction catalyst material thereby also trapping $NO_X$. Hence, a DPNR device traps both particulate soot and $NO_X$. One exemplary DPNR device is embodied as a porous monolithic honeycomb structure coated with a $NO_X$ storage reduction catalyst. Filter channels in the structure are alternatively plugged to force the exhaust gas flow through the porous wall where particulate soot is trapped temporally. The $NO_X$ storage reduction catalyst material is coated on both the substrate walls and also inside the substrate pores.

The emission abatement assembly 500 also includes an oxidation catalyst 506. The catalyst 506 may be embodied as any type of catalyst that is configured to catalyze oxidation reactions in an exhaust gas stream. In one exemplary embodiment, the catalyst 506 is embodied as a substrate having a precious metal or other type of catalytic material disposed thereon. Such a substrate may be constructed of ceramic, metal, or other suitable material. The catalytic material may be, for example, embodied as platinum, rhodium, palladium, including combinations thereof, along with any other similar catalytic materials. When positioned downstream of the DPNR devices 502, 504, the catalyst 506 may function to clean up any hydrogen or hydrocarbon "slip" from the DPNR devices 502, 504. For example, the oxidation catalyst 506 may be used to oxidize any $H_2$, certain hydrocarbons, or $H_2S$ that may be present in the gases exiting the devices 502, 504.

As shown in FIG. 12, a diverter valve 508 selectively diverts the flow of exhaust gas from the engine 112 between the DPNR devices 502, 504. In particular, the diverter valve 508 may be operated to divert a flow of exhaust gas from the engine 112 between a right flow path 510 and a left flow path 512. The right DPNR device 502 is positioned in the right flow path 510 such that exhaust gas or reformate gas advancing through the right flow path 510 is advanced through the right DPNR device 502. The left DPNR device 504 is positioned in the left flow path 512 such that exhaust gas or reformate gas advancing through the left flow path 512 is advanced through the left DPNR device 504.

As also shown in FIG. 12, the right flow path 510 and the left flow path 512 are recombined by a flow coupler 514. The flow coupler 514 is positioned downstream of the DPNR devices 502, 504 and upstream of oxidation catalyst 506. As a result, gas exiting the DPNR devices 502, 504 is directed through the oxidation catalyst 506.

In the exemplary embodiment described herein, a number of fluid lines such as pipes, tubes, or the like are utilized to create the various flow paths. In particular, an exhaust gas inlet 516 of the diverter valve 508 is fluidly coupled to an exhaust manifold 518 of the engine 112 via a fluid line 520. A right outlet 522 of the diverter valve 508 is fluidly coupled to an inlet 524 of the right DPNR device 502 via a fluid line 526, whereas a left outlet 528 of the diverter valve 508 is fluidly coupled to an inlet 530 of the left DPNR device 504 via a fluid line 532. An outlet 534 of the right DPNR device 502 is fluidly coupled to the flow coupler 514 via a fluid line 536, whereas an outlet 538 of the left DPNR device 504 is fluidly coupled to the flow coupler 514 via the fluid line 540. A fluid line 542 fluidly couples the flow coupler 514 to an inlet 544 of the oxidation catalyst 506. Via a fluid line 546, an outlet 548 of the oxidation catalyst 506 is either open to the atmosphere or coupled to an additional exhaust system component (not shown) positioned downstream of the oxidation catalyst 506.

In such a configuration, exhaust gas from the engine 112 may be routed through the emission abatement assembly 500 to remove, amongst other things, $NO_X$ and particulate soot therefrom. To do so, exhaust gas may be selectively routed between the two DPNR devices 502, 504 to allow for both treatment of the exhaust gas and device regeneration. For example, exhaust gas may be routed through the right DPNR device 502 while the left DPNR device 504 is maintained "offline." While offline, the left DPNR device 504 may undergo $NO_X$ and soot regeneration. In such a case, exhaust gas is advanced along a fluid path which includes the fluid line 520 from the exhaust manifold 518, the diverter valve 508, the fluid line 526 to the right DPNR device 502, through the device 502 and the fluid line 536 to the flow coupler 514, the fluid line 542 to the oxidation catalyst 506, through the catalyst 506 and out the fluid line 546.

Once the left DPNR device 504 has been regenerated, the position of the diverter valve 508 may be switched such that exhaust gas from the engine 112 is routed through the left DPNR device 504 while the right DPNR device 502 is offline for $NO_X$ and soot regeneration. In this case, exhaust gas is advanced along a fluid path which includes the fluid line 520 from the exhaust manifold 518, the diverter valve 508, the fluid line 532 to the left DPNR device 504, through the device 504 and the fluid line 540 to the flow coupler 514, the fluid line 542 to the oxidation catalyst 506, through the catalyst 506 and out the fluid line 546.

In addition to diverting exhaust gas from the engine 112 to the appropriate DPNR device 502, 504, the diverter valve 508 is also configured to divert reformate gas from the fuel reformer 12 to the appropriate DPNR device 502, 504. In particular, the outlet 76 (see FIG. 2) of the fuel reformer 12 is fluidly coupled to a reductant fluid inlet 548 of the diverter valve 508 via the fluid line 80. The diverter valve 508 diverts reformate gas from the fuel reformer 12 to the offline DPNR device 502, 504. In particular, as described above, engine exhaust gas is routed by the diverter valve 508 through one of the devices 502, 504 while the other device is maintained offline for regeneration. The diverter valve 508 routes engine exhaust gas through one of the devices 502, 504, while routing reformate gas from the fuel reformer 12 through the other device 502, 504. Hence, a single valve may be used to route both the engine exhaust gas and reformate gas to the appropriate DPNR device 502, 504 thereby eliminating the need to use multiple different valves. One diverter valve for doing so is described in copending U.S. patent application Ser. No. 10/345,681 entitled "Method and Apparatus for Directing Exhaust Gas and Reductant Fluid in an Emission Abatement System" which was filed on Jan. 16, 2003, is assigned to the same assignee as the present application, and is hereby incorporated by reference. It should be appreciated, however, that although use of a single diverter valve has a number of advantages, other valve arrangements, including valve arrangements having multiple valves, may be used with the concepts of the present disclosure.

The diverter valve 508 is electrically coupled to the electronic control unit 16 via a signal line 550. As such, the position of the diverter valve 508 is under the control of the electronic control unit 16. Hence, the electronic control unit 16, amongst its other functions, selectively directs the flow of exhaust gas from the engine 112 and the flow of reformate gas from the fuel reformer 12 to either the right DPNR device 502 or the left DPNR device 504, or a combination of both devices 502, 504.

The control scheme for controlling the position of the diverter valve 508 may be designed in a number of different manners. For example, a sensor-based control scheme may be utilized. In such a case, the position of the diverter valve 508 is changed as a function of output from one or more sensors associated with the DPNR devices 502, 504. For instance, regeneration of one of the DPNR devices 502, 504 may commence when the output from a $NO_X$ sensor 552 is indicative of a predetermined $NO_X$ accumulation level within the online device. More specifically, the $NO_X$ sensor 552 is positioned to sense the $NO_X$ content of exhaust gas passing through the fluid line 542. In such a downstream position relative to the DPNR devices 502, 504, the sensor 552 may be used to monitor the $NO_X$ accumulation level of the DPNR device 502, 504 through which engine exhaust gas is being routed (i.e., the online device). As such, when the output from the $NO_X$ sensor 552 indicates that a particular DPNR device 502, 504 is in need of regeneration, the control unit 16 takes the device 502, 504 in need of regeneration offline, and brings the other device 502, 504 online in the manner described above.

Alternatively, a timing-based control scheme may be utilized in which the position of the diverter valve 508 is changed as a function of time. For instance, regeneration of the devices 502, 504 may be performed at predetermined timed intervals. In such a case, the $NO_X$ sensor 552 may be all together eliminated, or used merely as a "failsafe" to ensure that regeneration is not prematurely needed during a timed interval.

Moreover, an engine-mapped control scheme may be utilized in which the position of the diverter valve 508 is changed as a function of engine load over time. In particular, an engine map may be created which allows the control unit 16 to track the amount of $NO_X$ which has been created by the engine 112 based on engine load conditions. When the control unit 16 determines that the engine 112 has generated a predetermined amount of $NO_X$, with such an amount being trapped in the online device 502, 504, the control unit 16 swaps the position of the diverter valve 508 thereby taking the device offline for regeneration and routing exhaust gas through the other device. As with the timing-based control scheme, the $NO_X$ sensor 552 may be all together eliminated from this control scheme, or used merely as a "failsafe" to ensure that regeneration is not prematurely needed during a mapped interval.

In regard to purging of particulate soot from the devices 502, 504, use of a catalyzed device allows for soot regeneration of the devices 502, 504 to be performed primarily as a result of the introduction of heat from the engine's exhaust gas onto the devices 502, 504. In other words, soot trapped in the devices 502, 504 will be constantly ignited or otherwise purged from the devices during operation of the engine 112. If need be, the operation of the engine 112 may be temporarily altered to facilitate the purging of particulate soot from the devices 502, 504. For example, the engine 112 may be operated to increase exhaust gas temperatures thereby increasing the oxidation rate of the trapped particulate soot. One way to do so is by the generation of a rich pulse of exhaust gas from the engine 112 to stimulate oxidation of the particulate soot trapped in the devices 502, 504. In addition to an increase in exhaust gas temperatures, generation of such a rich pulse also improves the catalytic activity of the precious metals of the devices 502, 504 and generates an additional amount of active oxygen thereby increasing the oxidation characteristics of the particulate soot.

However, in certain circumstances, one or both of the devices 502, 504 may become impregnated with an amount of particulate soot that cannot be removed by use of engine heat alone. For example, if the engine operating conditions cause an abnormally large amount of particulate soot to be generated (and hence trapped by the devices 502, 504), the DPNR devices 502, 504 may not be able to completely purge the particulate soot therefrom by use of exhaust gas heat alone. Moreover, if the engine 112 is operated in sustained transient conditions (e.g., startup, idle, etcetera), exhaust gas temperatures will be lowered thereby reducing regeneration efficiency of the DPNR devices 502, 504. In such cases, or any other case in which one or both of the DPNR devices 502, 504 become impregnated with an amount of particulate soot that cannot be removed by use of exhaust gas heat alone (or altered engine operation), reformate gas from the fuel reformer 12 may be used to assist in the purging of particulate soot from the DPNR devices 502, 504. Specifically, a quantity of reformate gas from the fuel reformer 12 may be advanced into the DPNR devices 502, 504 to facilitate oxidation of the particulate soot trapped therein. The hydrogen, carbon monoxide, and light hydrocarbons of the reformate gas react with oxygen to generate sufficient heat within the DPNR devices 502, 504 to burn off or otherwise combust the particulate soot trapped in the devices.

As shown in FIG. 12, each of the DPNR devices 502, 504 has a pair of pressure sensors 554, 556 associated therewith. The electronic control unit 16 is electrically coupled to the pressure sensors 554, 556 via a pair of signal lines 558, 560, respectively. The pressure sensors 554, 556 may be utilized to determine when the DPNR devices 502, 504 are in need of soot regeneration assistance from the fuel reformer 12. In particular, the pressure sensors 554, 556 sense the pressure difference across the DPNR devices 502, 504 to determine the soot accumulation level in the devices. Specifically, when the pressure drop across a given DPNR device 502, 504 increases to a predetermined value, the electronic control unit 16 determines that the given DPNR device 502, 504 is in need of regeneration and commences the assisted soot regeneration process (i.e., reformate gas is advanced to the given DPNR device). In lieu of such a dual sensor arrangement, a single pressure sensor on either side of DPNR device 502, 504 may be utilized, if desired. In such a configuration, the electronic control unit 16 would monitor when the pressure sensed by the single pressure sensor exceeded a predetermined upper threshold or was below a predetermined lower threshold, as opposed to monitoring the pressure drop across the DPNR device 502, 504. In any of these sensor configurations, when sensor output indicates that one of the DPNR devices 502, 504 is in need of particulate soot regeneration, the control unit 16 operates the fuel reformer 12 so as to generate a flow of reformate gas which is directed to the DPNR device 502, 504 thereby commencing the assisted regeneration process described above.

It should be appreciated that other assisted soot regeneration schemes utilizing reformate gas from the fuel reformer 12 are also contemplated. For example, the DPNR devices 502, 504 may be purged of particulate soot with heat generated in the fuel reformer 12 by increasing the air-to-fuel ratio of the air/fuel mixture being processed by the fuel reformer 12 (e.g., using an air/fuel mixture having an oxygen-to-carbon ratio between 1.4–4.0, instead of typical 1.0 to 1.4). Such operation will convert some or all of the $H_2$ and CO in the reformate gas into heat at the reformer 12. This heat may then be carried through the system to the DPNR devices 502, 504 to facilitate the particulate soot regeneration process. Such lean operation of the fuel reformer 12 may also be used to temporarily heat the DPNR devices 502, 504 to their de-sulfurization temperature (e.g., ~600 degrees Celsius). As such, a scheme may be utilized in which heat from the fuel reformer 12 is used to both de-sulfurize the DPNR devices 502, 504 and purge particulate soot from the DPNR devices 502, 504.

Figure 13:
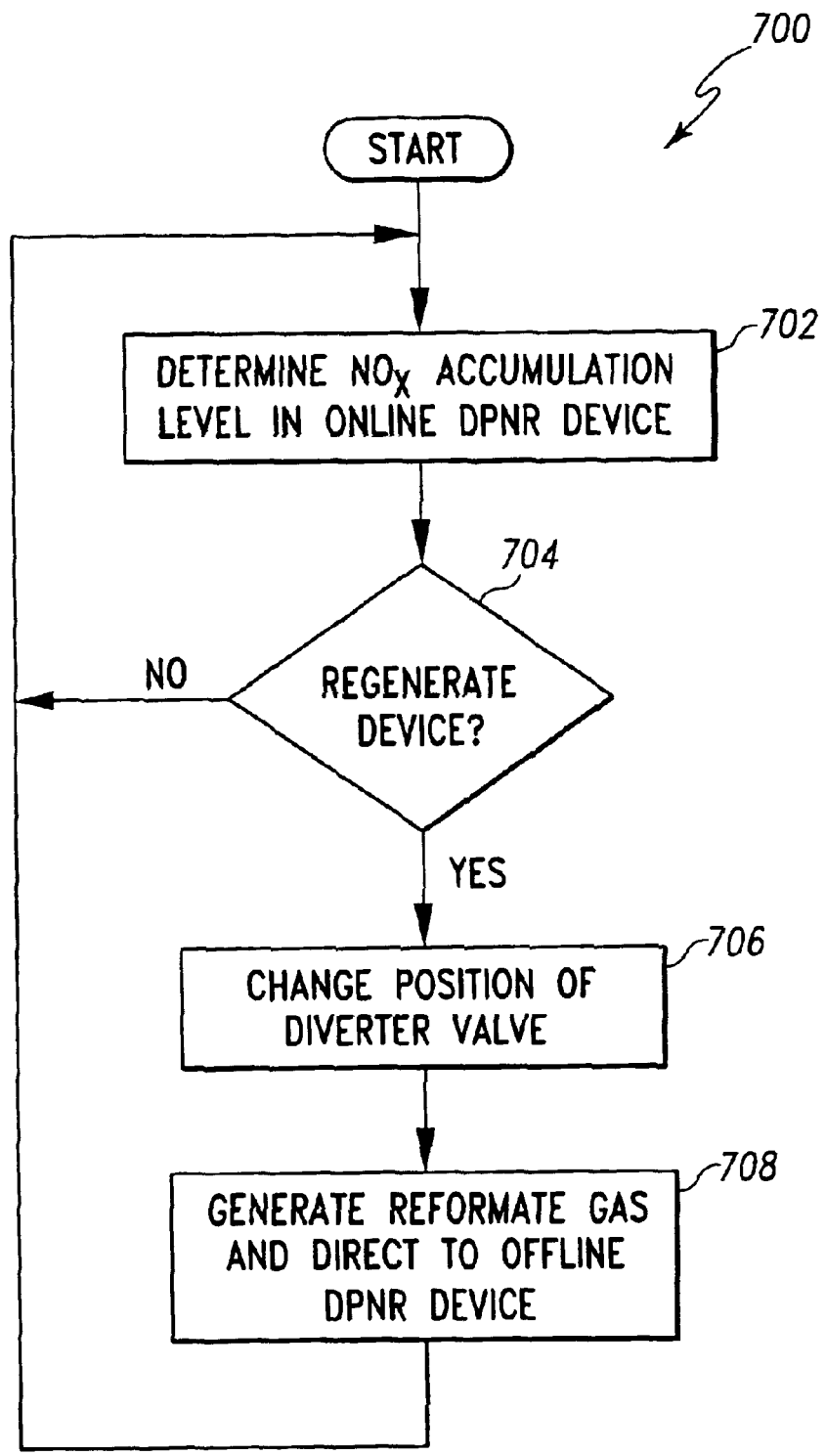
FIG. 13 is a flowchart of a control routine executed by the control unit to monitor and control $NO_X$ regeneration the DPNR devices of FIG. 12.

Referring now to FIG. 13, there is shown a control routine 700 for controlling operation of the DPNR devices during operation of the engine 112. The control routine 700 begins with step 702 in which the control unit 16 determines the $NO_X$ accumulation level in the online DPNR device 502, 504. As described above, the $NO_X$ accumulation in the online DPNR device 502, 504 may be determined in a number of different manners. For example, the $NO_X$ sensor 552 may be utilized in which case the control unit 16 scans or otherwise reads the signal line coupling the sensor 552 to the control unit 16 to monitor output from the sensor 552. As described above, the output signals produced by the $NO_X$ sensor 552 are indicative of the $NO_X$ accumulation level of the online DPNR device 502, 504. Alternatively, the control unit 16 may determine the $NO_X$ accumulation level of the online DPNR device by determining the amount of time which has elapsed since the DPNR device was last regenerated. Moreover, the control unit 16 may also determine the accumulation level of the online device by use of an engine-map technique. In any case, once the control unit 16 has determined the $NO_X$ accumulation level of the online DPNR device 502, 504, the control routine 700 advances to step 704.

In step 704, the control unit 16 determines if the $NO_X$ accumulation level within the online DPNR device 502, 504 necessitates regeneration of the device. In particular, a predetermined accumulation level or "set point" may be established at which point the DPNR device is in need of $NO_X$ regeneration. As such, in step 704, the control unit 16 determines if the $NO_X$ accumulation level of the online DPNR device equals or exceeds the set point. If the $NO_X$ accumulation level within the online DPNR device is below the set point, the control routine 700 loops back to step 702 to continue monitoring the $NO_X$ accumulation level within the online DPNR device 502, 504. However, if the $NO_X$ accumulation level within the online DPNR device 502, 504 is greater than or equal to the set point, a control signal is generated, and the control routine 700 advances to step 706.

In step 706, the control unit 16 redirects engine exhaust gas to the offline DPNR device 502, 504. In particular, the control unit 16 generates an output signal on the signal line 550 thereby moving the diverter valve 508 from its current valve position to the opposite valve position. Such movement of the diverter valve 508 swaps the online/offline status of the DPNR devices 502, 504. For example, if the right DPNR device 502 is online (and determined to be saturated beyond the set point in step 704), the control unit 16 generates an output signal on the signal line 550 which causes the diverter valve 508 to be moved from its current valve position to the opposite valve position thereby bringing the DPNR device 504 online. Conversely, if the left DPNR device 504 is online (and determined to be saturated beyond the set point in step 704), the control unit 16 generates an output signal on the signal line 550 which causes the diverter valve 508 to be moved from its current valve position to the opposite valve position thereby bringing the DPNR device 502 online. Once the position of the diverter valve 508 has been switched in such a manner, engine exhaust gas will be directed to the newly online DPNR device. The control routine 700 then advances to step 708.

In step 708, the control unit 16 regenerates the newly offline DPNR device 502, 504 (i.e., the DPNR device determined to be saturated beyond the set point in step 704). In particular, the control unit 16 commences operation of the fuel reformer 12 so as to generate reformate gas therewith. The reformate gas exiting the fuel reformer 12 is then advanced to the diverter valve 508 where, based on the valve's repositioning in step 706, the reformate gas is directed to the offline DPNR device. The control routine 700 then loops back to step 702 to commence monitoring of the online DPNR device.

As described above, exhaust gas exiting the online DPNR device 502, 504 is directed through the oxidation catalyst 506. As a result, any "slip" from the DPNR devices 502, 504 (e.g., hydrogen, hydrocarbons, or $H_2S$) is oxidized by the oxidation catalyst 506.

As also described above, particulate soot regeneration of the DPNR devices 502, 504 will by in large be sustained by the introduction of heat from the engine's exhaust gas. In other words, particulate soot trapped in the DPNR devices 502, 504 will be constantly ignited or otherwise purged from the devices during operation of the engine. Moreover, operational parameters of the engine 112 may be temporarily altered to facilitate particulate soot regeneration (e.g., increased exhaust gas temperature). However, in certain circumstances, the DPNR devices 502, 504 may become impregnated with an amount of particulate soot that cannot be removed by use of engine heat alone.

Figure 14:
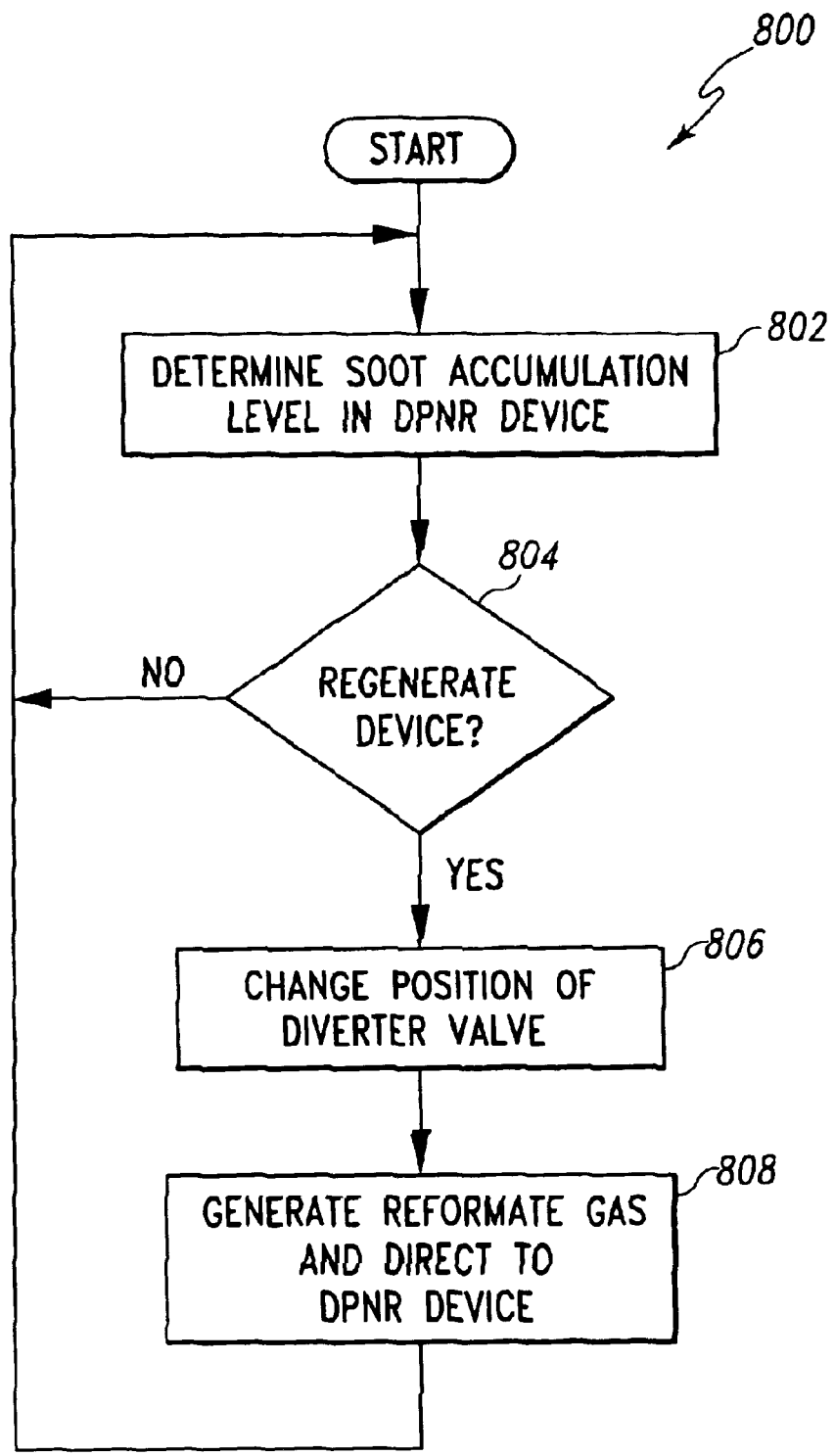
FIG. 14 is a flowchart of a control routine executed by the control unit to monitor and control soot regeneration of the DPNR devices of FIG. 12.

To monitor for such situations, the control unit 16 executes a control routine 800, as shown in FIG. 14. The control routine 800 is executed contemporaneously with the control routine 700 of FIG. 13. The routine 800 begins with step 802 in which the control unit 16 determines the soot accumulation level in one or both of the DPNR devices 502, 504. Specifically, the control unit 16 scans or otherwise reads the signal lines 558, 560 to monitor output from the pressure sensors 554, 556, respectively. As described above, the output signals produced by the pressure sensors 554, 556 reflect the pressure drop across the DPNR device 502, 504, and, as a result, are indicative of the soot accumulation level in the device. Once the control unit 16 has determined the soot accumulation level in a given device 502, 504, the control routine 800 advances to step 804.

In step 804, the control unit 16 determines if the soot accumulation level within the given DPNR device 502, 504 necessitates particulate soot regeneration of the device 502, 504. In particular, a predetermined soot accumulation level or "set point" may be established at which point the DPNR device 502, 504 is deemed to be in need of assistance in regard to soot regeneration thereof. For example, a set point in the form of a variable obtained from an engine map or a measured exhaust flow may be used. As such, in step 804, the control unit 16 determines if the soot accumulation level of the DPNR device 502, 504 equals or exceeds the set point. If the soot accumulation level within the DPNR device 502, 504 is below the set point, the control routine 800 loops back to step 802 to continue monitoring the soot accumulation level within the DPNR devices 502, 504. However, if the soot accumulation level within one of the DPNR devices 502, 504 is greater than or equal to the set point, a control signal is generated, and the control routine 800 advances to step 806.

In step 806, the control unit 16 positions the diverter valve 508 to allow for the advancement of reformate gas from the fuel reformer 12 to the DPNR device 502, 504 in need of soot regeneration. In particular, the control unit 16 generates an output signal on the signal line 550 thereby moving the diverter valve 508 to a valve position in which reformate gas may be diverted to the DPNR device in need of soot regeneration. The control routine 800 then advances to step 808.

In step 808, the control unit 16 commences operation of the fuel reformer 12 so as to generate reformate gas therewith. The reformate gas exiting the fuel reformer 12 is then advanced to the selected DPNR device to facilitate soot regeneration thereof. The control routine 800 then loops back to step 802 to commence monitoring of the soot accumulation level in the devices.

Figure 15:
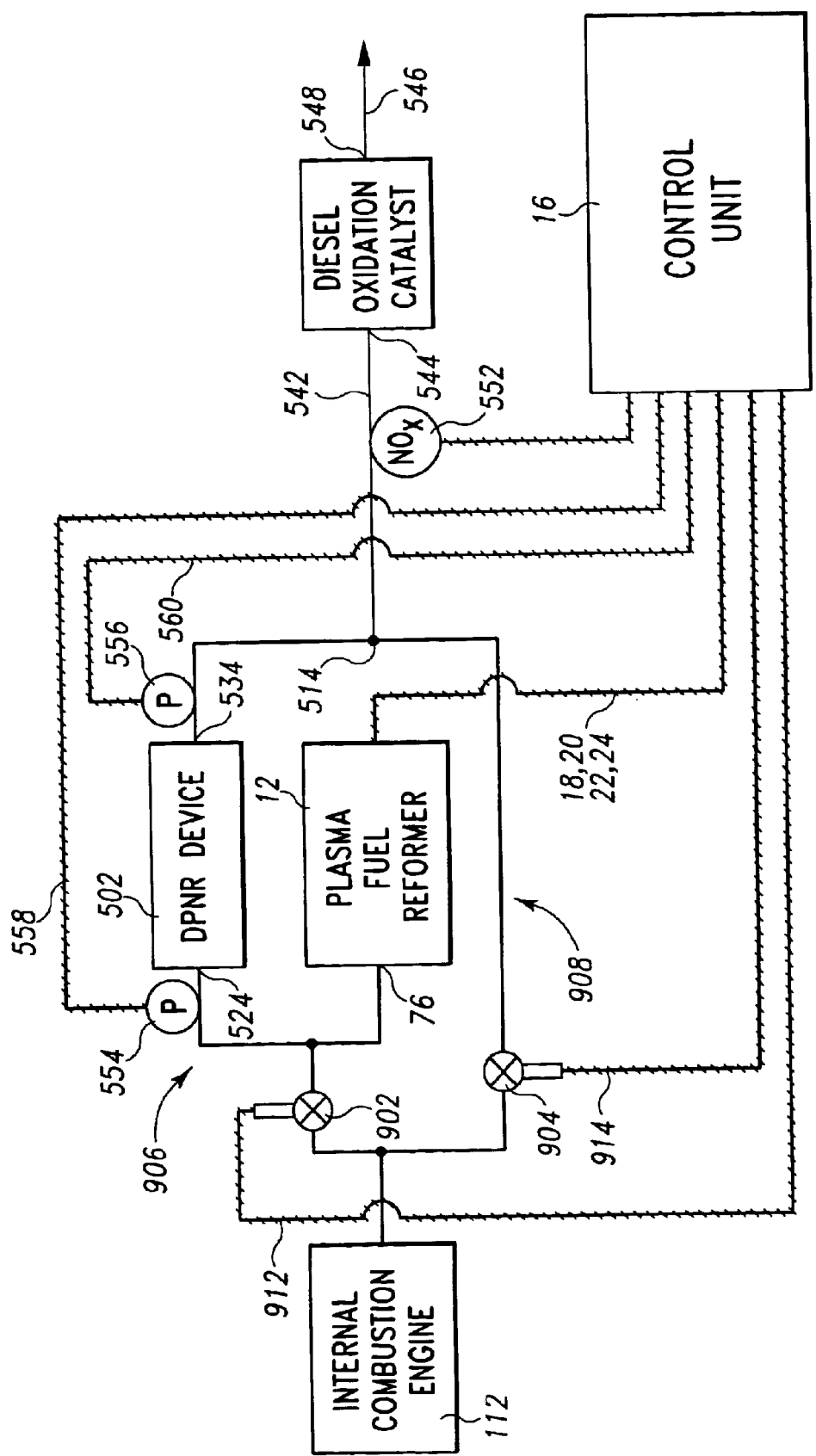
FIG. 15 is a view similar to FIG. 12, but showing another embodiment of an emission abatement assembly which utilizes DPNR devices.

Referring now to FIG. 15, there is shown an emission abatement assembly which is similar to the assembly shown in FIG. 12. The same reference numerals are used in FIG. 15 to designate common components which were previously discussed in regard to FIG. 12 with additional discussion thereof being unwarranted.

The system of FIG. 15 is somewhat similar to the system of FIG. 12 with the exception that only a single DPNR device 502 is used. The use of a single DPNR device may be particularly useful in the case of a vehicle retrofit application.

In the assembly of FIG. 15, a pair of exhaust diverter valves 902, 904 are utilized in lieu of the diverter valve 508. Use of the diverter valves 902, 904 allows for advancement of engine exhaust gas through either a device flow path 906 or a bypass flow path 908. As shown in FIG. 15, the DPNR device 502 is positioned in the device flow path 906, but is isolated from the bypass flow path 908. As such, when the diverter valve 902 is positioned in its open position and the diverter valve 904 is positioned in its closed position, exhaust gas from the engine 112 is directed along the device flow path 906 and hence through the DPNR device 502. However, when the diverter valve 902 is positioned in its closed position and the diverter valve 904 is positioned in its open position, exhaust gas from the engine 112 is directed along the bypass flow path 908 and hence bypasses the DPNR device 502.

To operate in such a manner, the diverter valves 902, 904 are electrically coupled to the electronic control unit 16 via a pair of signal lines 912, 914, respectively. As such, the position of each of the diverter valves 902, 904 is under the control of the electronic control unit 16. Hence, the electronic control unit 16, amongst its other functions, selectively directs the flow of exhaust gas from the engine 112 to either the DPNR device 502 or the bypass flow path 908, or a combination thereof.

The control scheme for controlling the position of the diverter valves 902, 904 may be designed in a number of different manners. For example, a sensor-based control scheme similar to described herein in regard to FIG. 12 may be utilized. In such a case, the position of each of the diverter valves 902, 904 is changed as a function of output from the $NO_X$ sensor 552. As such, when the output from the $NO_X$ sensor 552 indicates that the DPNR device 502 is in need of regeneration, the control unit 16 operates the diverter valves 902, 904 to direct the exhaust gas from the engine 112 through the bypass flow path 908 thereby allowing for offline regeneration of the DPNR device 502 by use of reformate gas from the fuel reformer 12 in the manner described above.

Alternatively, a timing-based control scheme may be utilized in which the position of each of the diverter valves 902, 904 is changed as a function of time. For instance, regeneration of the DPNR device 502 may be performed at predetermined timed intervals. In such a case, the $NO_X$ sensor 552 may be all together eliminated, or used merely as a "failsafe" to ensure that regeneration is not prematurely needed during a timed interval.

Moreover, an engine-mapped control scheme may be utilized in which the position of each of the diverter valves 902, 904 is changed as a function of engine load over time. In particular, an engine map may be created which allows the control unit 16 to track the amount of $NO_X$ which has been created by the engine 112 based on engine load conditions. When the control unit 16 determines that the engine 112 has generated a predetermined amount of $NO_X$, with such an amount being trapped in the DPNR device 502, the control unit 16 operates the diverter valves 902, 904 to direct the exhaust gas from the engine 112 through the bypass flow path 908 thereby allowing for offline regeneration of the DPNR device 502 by use of reformate gas from the fuel reformer 12 in the manner described above. As with the timing-based control scheme, the $NO_X$ sensor 552 may be all together eliminated from this control scheme, or used merely as a "failsafe" to ensure that regeneration is not prematurely needed during a mapped interval.

The DPNR device 502 may also be purged of particulate soot in any of the manners described above in regard to the DPNR devices 502, 504 of FIG. 12. In particular, the DPNR device 502 of the assembly of FIG. 15 may be purged of particulate soot by use of exhaust gas heat. Moreover, operation of the engine 112 may be altered to facilitate such soot regeneration of the DPNR device. However, in certain cases, it may be necessary to perform an assisted soot regeneration of the DPNR device 502 of the assembly of FIG. 15 in which reformate gas from the fuel reformer 12 is supplied to the DPNR device.

As can be seen from the foregoing description, the concepts of the present disclosure provide numerous features and advantages relative to other systems. For example, amongst other things, the concepts of the present disclosure allow for the operation of a heating and air conditioning system of an on-highway truck without requiring concurrent operation of the truck's engine. Such a feature is advantageous for both fuel consumption and emissions reduction reasons.

Moreover, by generating and supplying reformate gas to the emission abatement devices of the present disclosure, the efficiency of such devices is enhanced. In addition, the number and type of compounds which may be treated is also enhanced.

In addition, by use of a combination emission abatement assembly, the a single fuel reformer may be utilized to regenerate a number of different exhaust treatment devices. In such a way, multiple exhaust compounds (e.g., $NO_X$ and soot) can be removed from the exhaust flow by use of a single assembly.

Further, by "customizing" the quantity and/or composition of reformate gas generated and supplied to various devices, the efficiency associated with operation of the plasma fuel reformer 12 is enhanced. In other words, operation of the plasma fuel reformer 12 may be refined to generate and supply a quantity and/or composition of reformate gas that is sufficient to support operation of a given device, without being "wasteful."

Yet further, use of a fuel reformer to regenerate a DPNR device enhances the operation thereof relative to other regeneration schemes. In particular, use of reformate gas reduces the number of occasions in which the DPNR device becomes overly saturated with either $NO_X$ or particulate soot.

While the disclosure is susceptible to various modifications and alternative forms, specific exemplary embodiments thereof have been shown by way of example in the drawings and has herein be described in detail. It should be understood, however, that there is no intent to limit the disclosure to the particular forms disclosed, but on the contrary, the intention is to cover all modifications, equivalents, and alternatives falling within the spirit and scope of the disclosure.

There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of apparatus, systems, and methods that incorporate one or more of the features of the present disclosure and fall within the spirit and scope of the present disclosure.

What is claim is:

1. A method of operating an emission abatement assembly, the method comprising the steps of:
   determining if regeneration of a first DPNR device is to be performed and generating a first regenerate-DPNR signal in response thereto,
   operating a fuel reformer so as to produce and advance reformate gas to the first DPNR device in response to generation of the first regenerate-DPNR signal,
   determining if regeneration of a second DPNR device is to be performed and generating a second regenerate-DPNR signal in response thereto,
   operating the fuel reformer so as to produce and advance reformate gas to the second DPNR device in response to generation of the second regenerate-DPNR signal,
   positioning a diverter valve in a first valve position so as to direct reformate gas to the first DPNR device in response to generation of the first regenerate-DPNR signal, and
   positioning the diverter valve in a second valve position so as to direct reformate gas to the second DPNR device in response to generation of the second regenerate-DPNR signal.

2. The method of claim 1, further comprising the steps of:
   positioning the diverter valve in the first valve position so as to reduce a flow of exhaust gas through the first DPNR device in response to generation of the first regenerate-DPNR signal, and
   positioning the diverter valve in the second valve position so as to reduce the flow of exhaust gas through the second DPNR device in response to generation of the second regenerate-DPNR signal.

3. The method of claim 1, further comprising the step of advancing exhaust gases from an internal combustion engine through the first DPNR device, wherein the determining step is performed contemporaneously with the exhaust gases advancing step.

4. The method of claim 1, wherein the step of determining if regeneration of the first DPNR device is to be performed comprises sensing the amount of $NO_X$ in a flow of exhaust gas.

5. The method of claim 1, wherein the step of determining if regeneration of the first DPNR device is to be performed comprises sensing a pressure drop across the first DPNR device.

6. The method of claim 1, wherein the step of determining if regeneration of the first DPNR device is to be performed comprises determining if a predetermined period of time has elapsed since the first DPNR device was last regenerated.

7. The method of claim 1, wherein the step of determining if regeneration of the first DPNR device is to be performed comprises determining an amount of $NO_X$ produced by an internal combustion engine since the first DPNR device was last regenerated.

8. An emission abatement assembly, comprising:
   a first DPNR device for removing $NO_X$ and particulate soot from an exhaust gas of an internal combustion engine,
   a plasma fuel reformer for reforming a hydrocarbon fuel into a reformate gas, the plasma fuel reformer being fluidly coupled to the first DPNR device,
   a second DPNR device fluidly coupled to the plasma fuel reformer, the first DPNR device and the second DPNR device being arranged in separate parallel flow paths, and
   a flow diverter valve fluidly coupled to the first DPNR device, the second DPNR device, and the plasma fuel reformer, the flow diverter valve being operable to divert reformate gas from the plasma fuel reformer between the first DPNR device and the second DPNR device.

9. The emission abatement assembly of claim 8, further comprising an electronic control unit electrically coupled to the plasma fuel reformer and the flow diverter valve, the electronic control unit being configured to control operation of both the plasma fuel reformer and the flow diverter valve so as to (i) advance reformate gas from the plasma fuel reformer to the first DPNR device during a first period of time, and (ii) advance reformate gas from the plasma fuel reformer to the second DPNR device during a second period of time.

10. An emission abatement assembly, comprising:
    a first DPNR device having a gas inlet,
    a fuel reformer having a gas outlet fluidly coupled to the gas inlet of the first DPNR device,
    an electronic control unit electrically coupled to the fuel reformer, the electronic control unit comprising (i) a processor, and (ii) a memory device electrically coupled to the processor, the memory device having stored therein a plurality of instructions which, when executed by the processor, causes the processor to:
    (a) determine if regeneration of the first DPNR device is to be performed and generate a first regenerate-DPNR signal in response thereto, and
    (b) operate the fuel reformer so as to produce and advance reformate gas to the gas inlet of the first DPNR device in response to generation of the first regenerate-DPNR signal,
    a second DPNR device having a gas inlet, wherein:
      the gas outlet of the fuel reformer is fluidly coupled to the gas inlet of the second DPNR device, and
      the plurality of instructions, when executed by the processor, further cause the processor to (a) determine if regeneration of the second DPNR device is to be performed and generate a second regenerate-DPNR signal in response thereto, and (b) operate the fuel reformer so as to produce and advance reformate gas to the gas inlet of the second DPNR device in response to generation of the second regenerate-DPNR signal, and
    a diverter valve electrically coupled to the electronic control unit, wherein:
      the diverter valve is fluidly coupled to (i) the gas inlet of the first DPNR device, (ii) the gas inlet of the second DPNR device, and (iii) the gas outlet of the fuel reformer, and
      the plurality of instructions, when executed by the processor, further cause the processor to (a) position the diverter valve in a first valve position so as to direct reformate gas to the gas inlet of the first DPNR device in response to generation of the first regenerate-DPNR signal, and (b) position the diverter valve in a second valve position so as to direct reformate gas to the gas inlet of the second DPNR device in response to generation of the second regenerate-DPNR signal.

11. The emission abatement assembly of claim 10, further comprising a $NO_X$ sensor configured to sense the amount of $NO_X$ in a flow of exhaust gas, wherein the plurality of instructions, when executed by the processor, further cause the processor to determine if regeneration of the first DPNR device is to be performed based on output from the $NO_X$ sensor.

12. The emission abatement assembly of claim 10, further comprising a pressure sensor configured to sense a pressure drop across the first DPNR device, wherein the plurality of instructions, when executed by the processor, further cause the processor to determine if regeneration of the first DPNR device is to be performed based on output from the pressure sensor.

13. The emission abatement assembly of claim 10, wherein the plurality of instructions, when executed by the processor, further cause the processor to generate the first regenerate-DPNR signal if a predetermined period of time has elapsed since the first DPNR device was last regenerated.

* * * * *